(12) United States Patent
Tsutsumi

(10) Patent No.: US 6,288,847 B1
(45) Date of Patent: Sep. 11, 2001

(54) ATTACHMENT LENS SYSTEM

(75) Inventor: Katsuhisa Tsutsumi, Saitama (JP)

(73) Assignee: Fuji Photo Optical. Co., Ltd., Saitama (JP)

( * ) Notice: Subject to any disclaimer, the term of this patent is extended or adjusted under 35 U.S.C. 154(b) by 0 days.

(21) Appl. No.: 09/262,069

(22) Filed: Mar. 4, 1999

(30) Foreign Application Priority Data

Mar. 4, 1998 (JP) ................................................. 10-069576

(51) Int. Cl.⁷ .............................. G02B 15/02; G02B 9/60; G02B 9/34
(52) U.S. Cl. ........................... 359/675; 359/763; 359/771
(58) Field of Search .................................. 359/675, 672, 359/771, 781, 782, 754–756, 763

(56) References Cited

U.S. PATENT DOCUMENTS 4,154,508 * 5/1979 Nakamura ............................. 359/675
4,239,340 * 12/1980 Ogino ................................... 359/675
5,253,112 * 10/1993 Suzuki et al. ........................ 359/675

FOREIGN PATENT DOCUMENTS 7-174968    7/1995 (JP) .

* cited by examiner

Primary Examiner—Jordan M. Schwartz
(74) Attorney, Agent, or Firm—Young & Thompson

(57) ABSTRACT

An attachment lens optical system for extending a focal length of a camera lens and balancing axial chromatic aberrations of the camera lens comprises, in order from the object side, a first lens group having a negative power single lens element, a second lens group including a cemented doublet of a biconcave lens element and a biconvex lens element, a positive power third lens group including three lens elements, and a negative power fourth lens group including a cemented doublet of two lens elements.

10 Claims, 21 Drawing Sheets

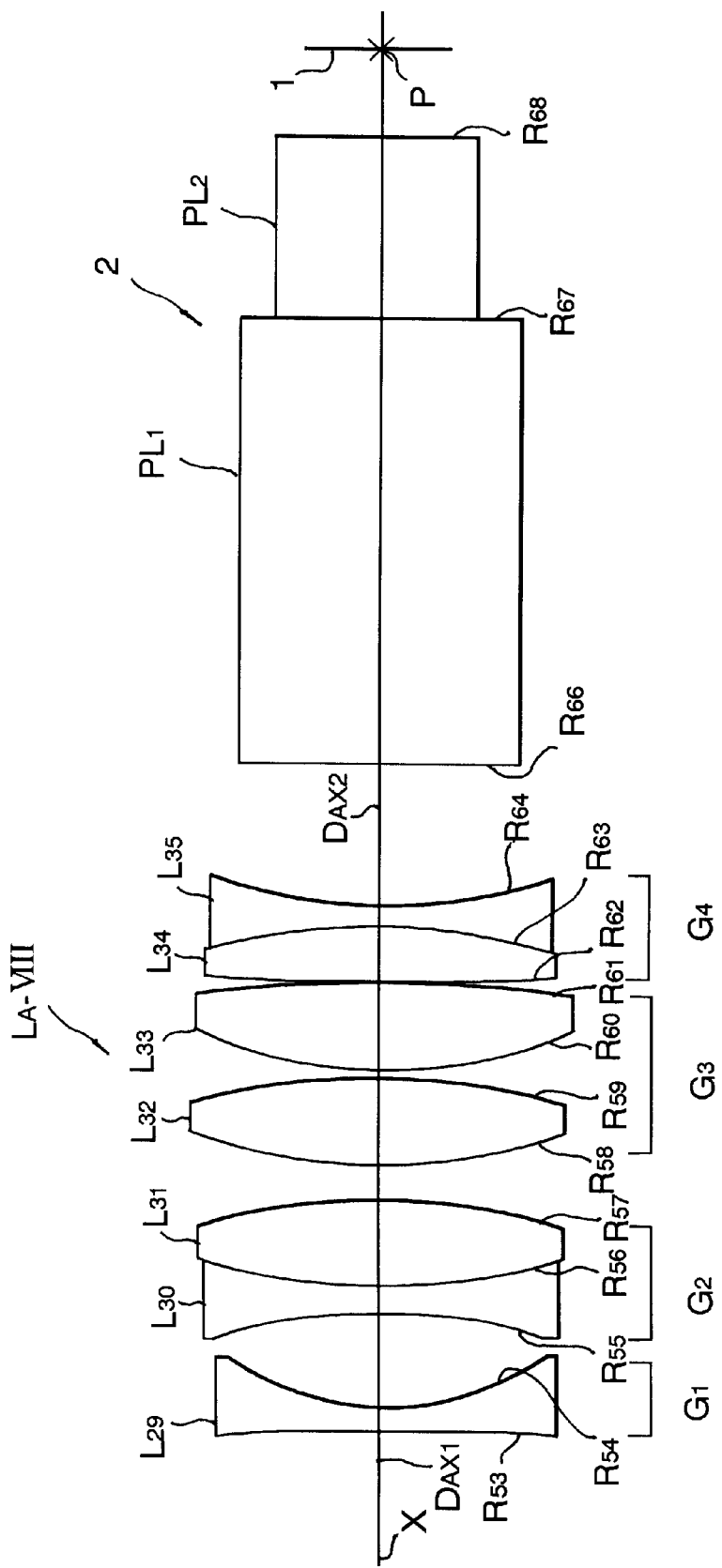

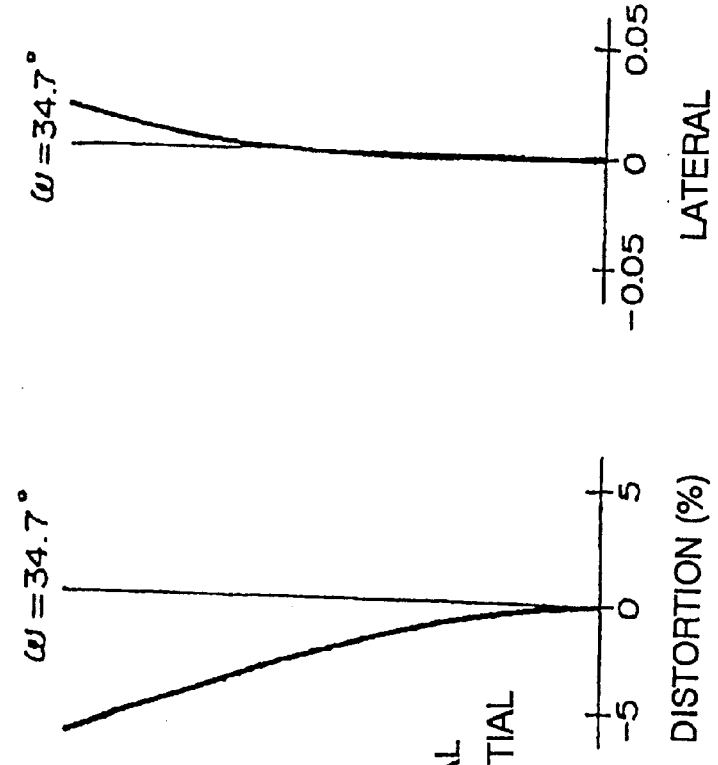
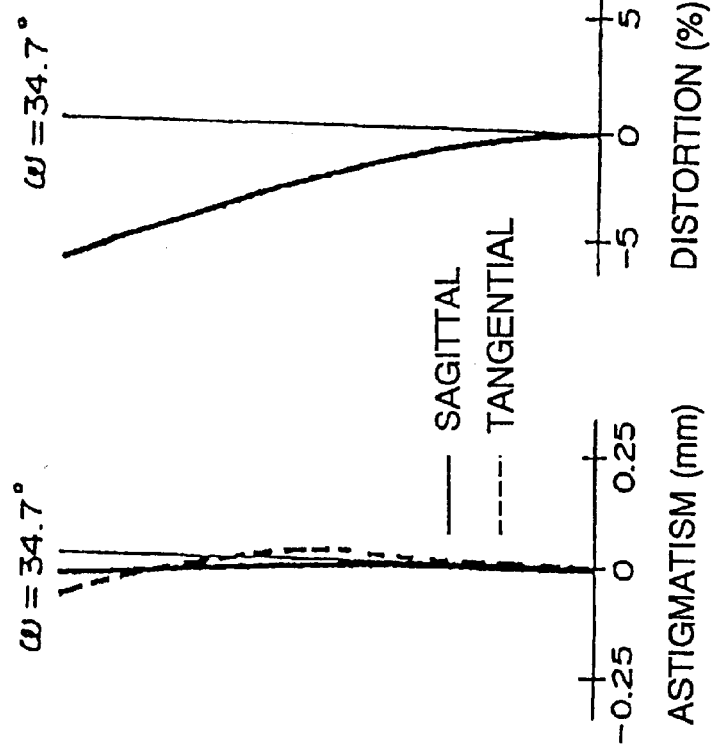
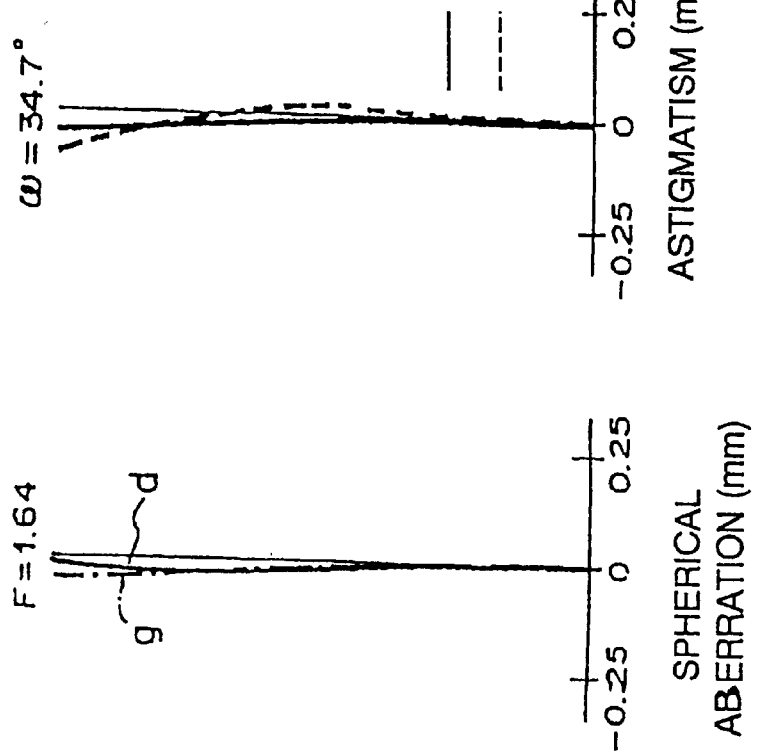

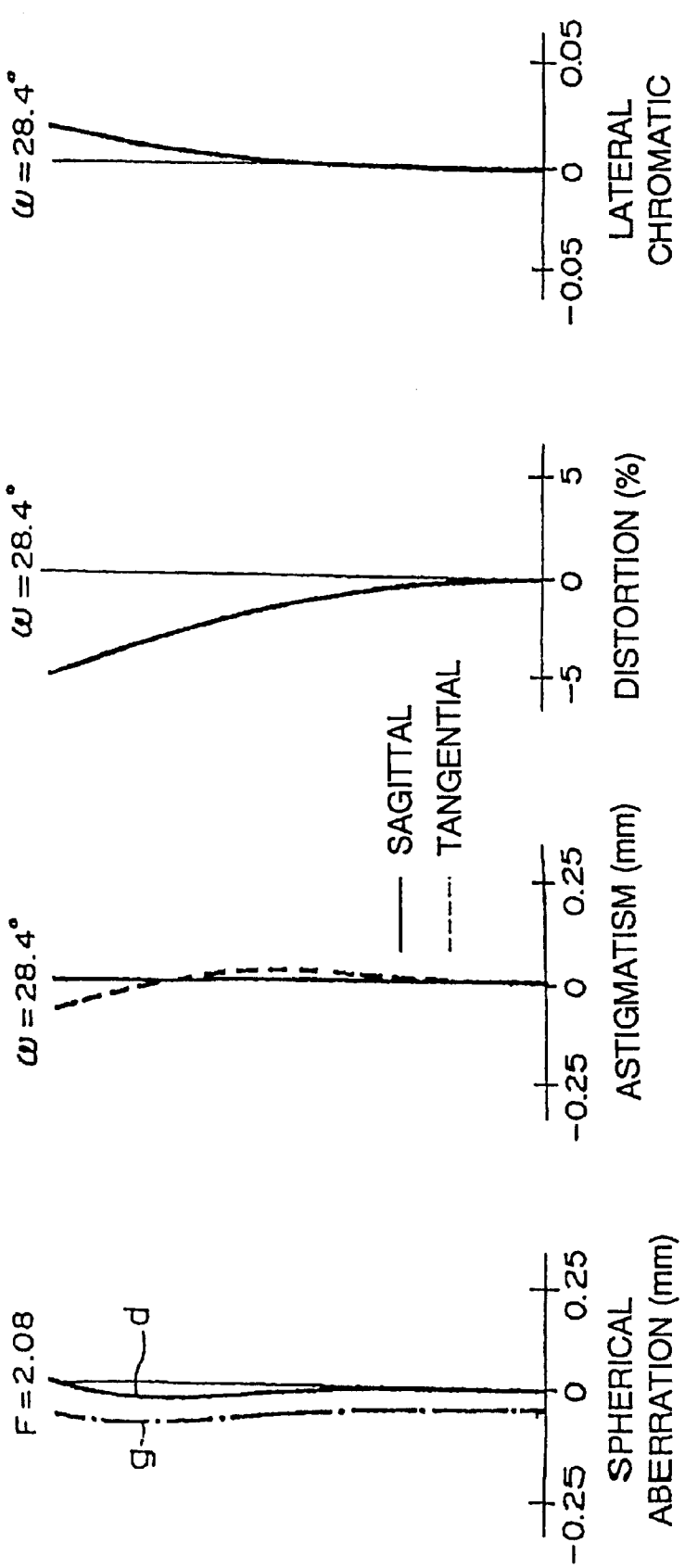

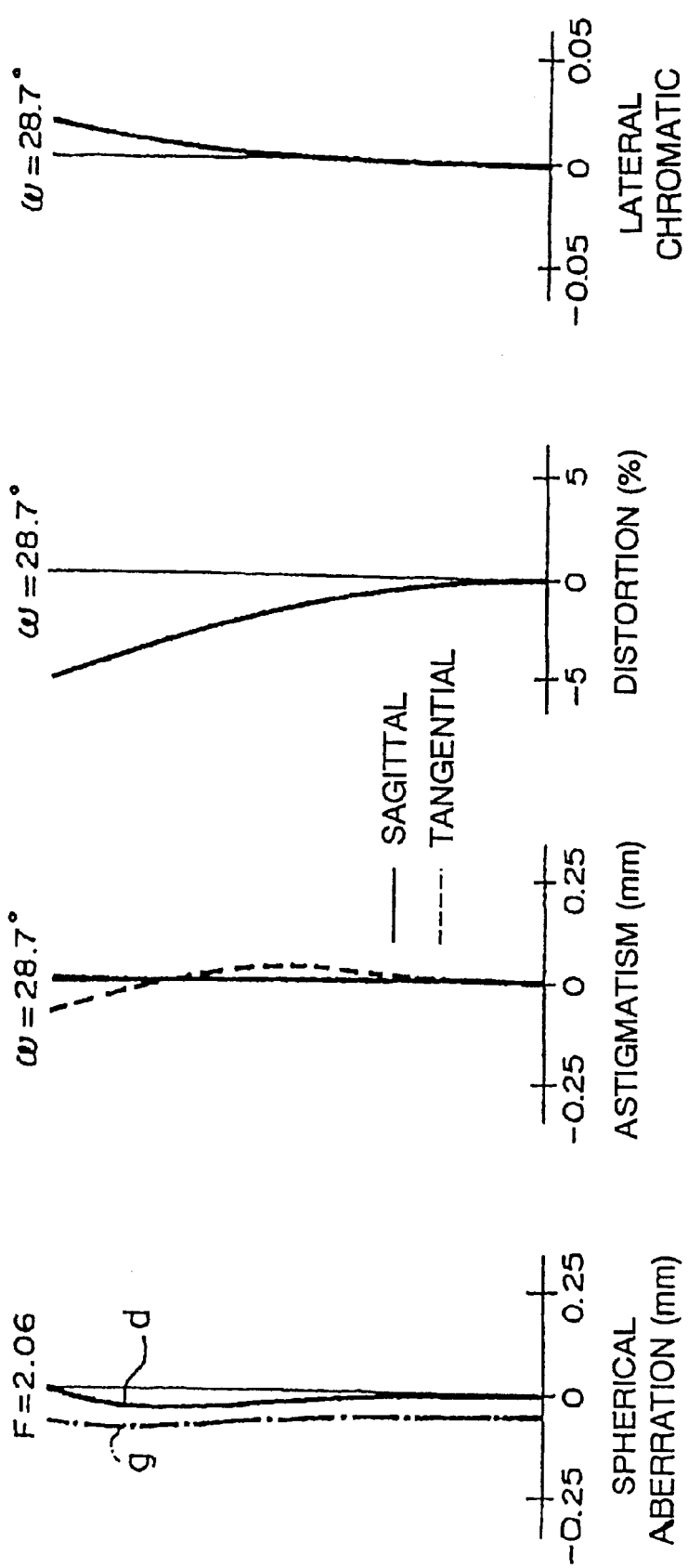

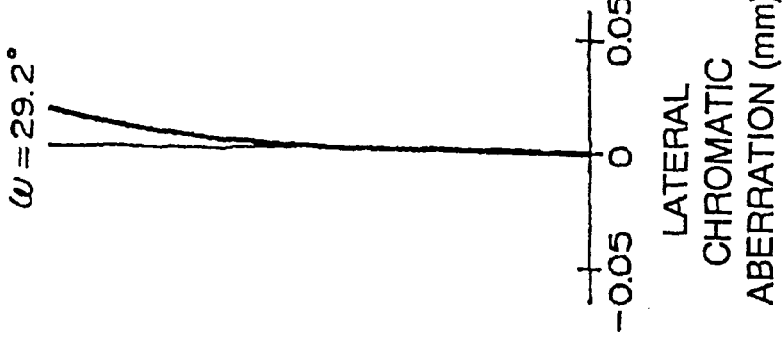
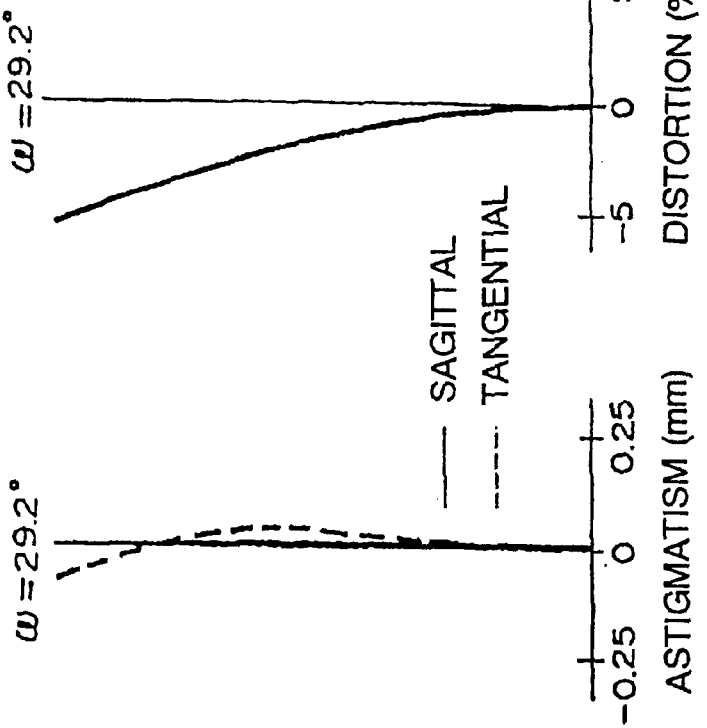
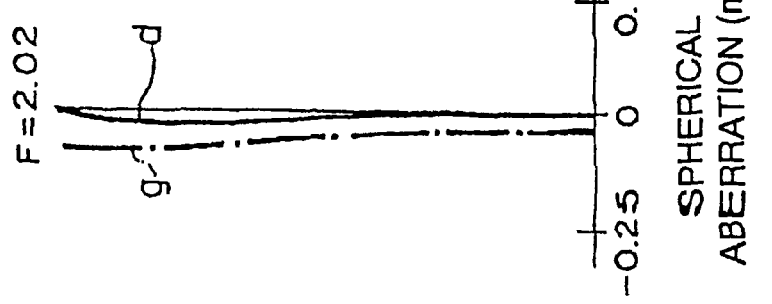

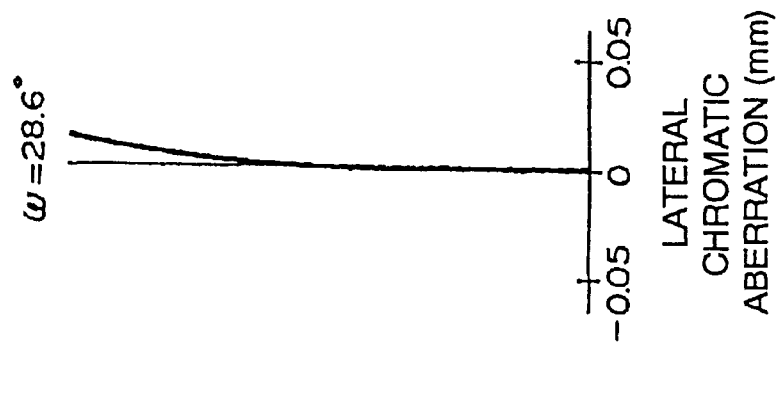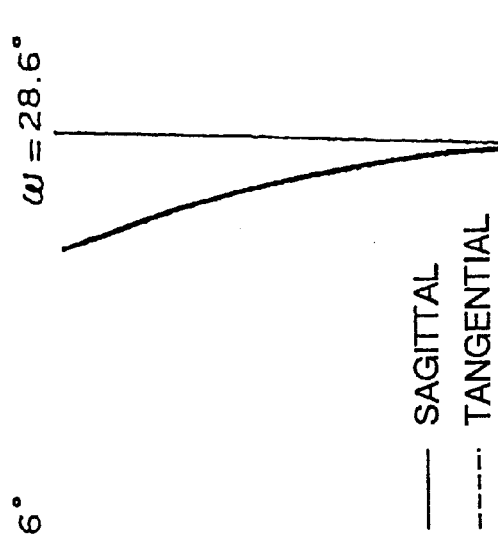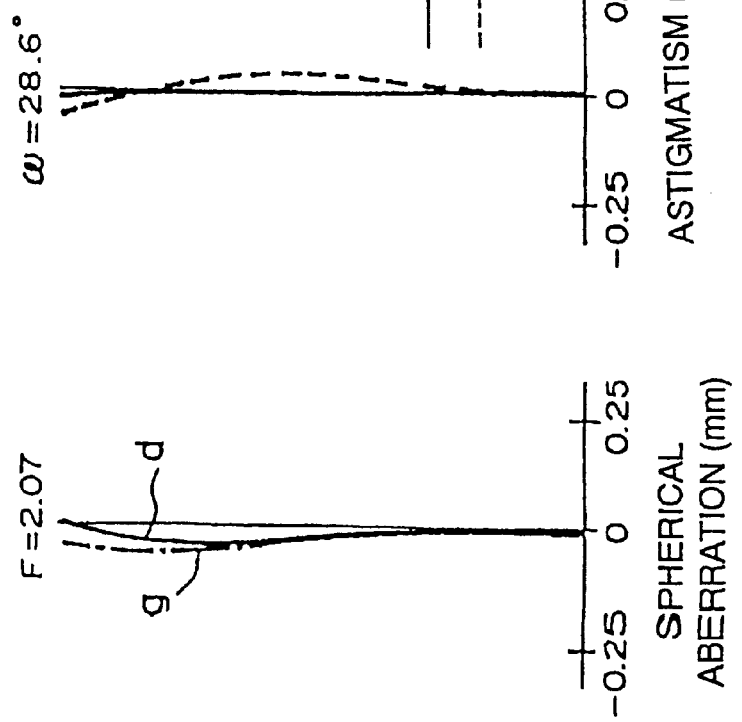

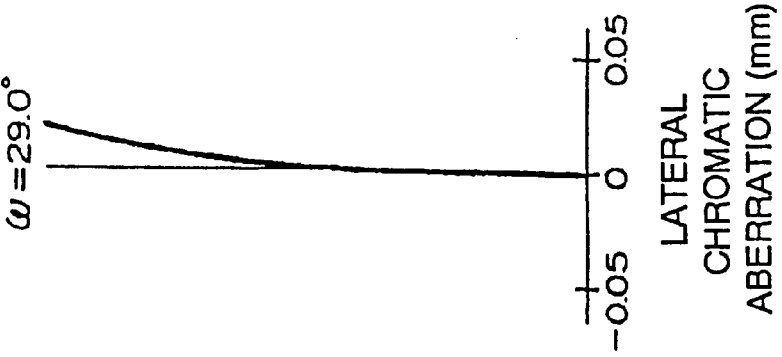
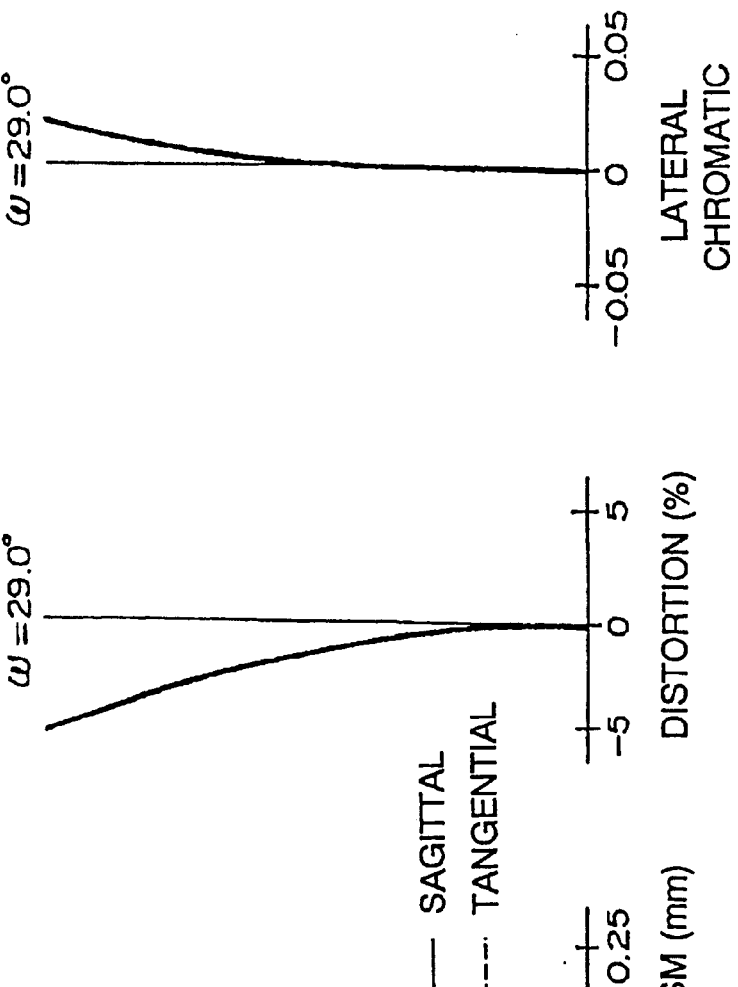
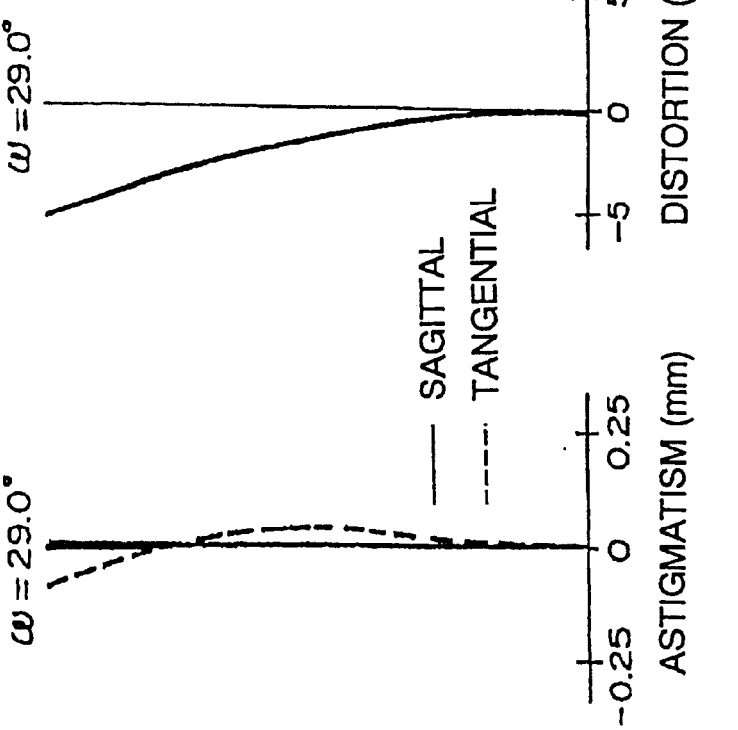
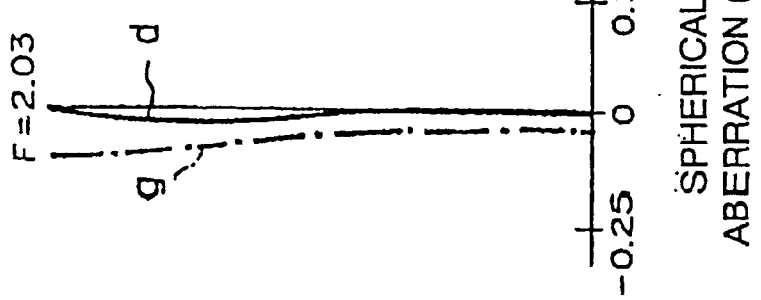

ATTACHMENT LENS SYSTEM

BACKGROUND OF THE INVENTION

1. Field of the Invention

The invention relates to an attachment lens detachably for extending the focal length of a main camera lens and camera such as a television camera and a video camera with which the attachment lens is used together, and, more particularly, to an attachment lens detachably incorporated between a main camera lens and a camera such as a television camera and a video camera equipped with a color separation optical system or assembly and/or filters which imposes restraints on optical dimensions such as a back-focal distance.

1. Description of Related Art

With an increased demand of high resolution for the entire area of a charge coupled device (CCD) installed as an image forming device in cameras such as a TV camera and a video camera, the camera lens is required to have optical performance to form the whole area of image with a high and uniform resolution. On the other hand, there have been put to practical use various types of attachment lenses which extend the focal length of a camera lens with which the attachment lens is used together without shifting the focal point of the camera lens. Such an attachment lens is essential to provide the overall lens system with a high resolution power. One of such attachment lenses known from, for example, Japanese Unexamined Patent Publication No. 7-174968 has a magnification between approximately 1.1 and 1.2 which is suitably used together with a still camera or a video camera having a relatively short back-focal distance.

TV camera lenses and video camera lenses which are required to have a relatively high resolution power are essential to have a long back-focal distance because TV cameras and video cameras incorporate a color separation optical system and/or a filter assembly in front of an imaging device therein. Such a TV camera lens or a video camera lens is generally required to have a relatively long distance to an exit pupil. If the exit pupil is at a short distance, there occurs color shading due to a difference in incident angles of principal light rays incident upon upper and lower margins of a dichroic mirror of the color separation optical assembly. Therefore, the attachment lens of this type is essential to have a long distance to the exit pupil as well as a long back-focal length.

TV camera lenses and video camera lenses are designed so as to appropriately balance the axial chromatic aberrations of the lens according to glass kinds used for color separation optical assemblies. If the attachment lens is able to change the balance of axial chromatic aberrations of the TV camera lens or the video camera lens, the attachment lens is exceedingly conveniently used together with TV cameras and video cameras which are equipped color separation optical assemblies made of different types of glasses.

SUMMARY OF THE INVENTION

It is accordingly an object of the invention to provide an attachment lens for use with a camera lens of a TV camera or a video camera equipped with a color separation optical system which keeps high resolution power of the camera lens without causing a change in aberrations.

It is another object of the invention to provide an attachment lens for use with a camera lens of a TV camera or a video camera equipped with a color separation optical system which provides a long back-focal distance and a long distance to an exit pupil.

It is a further object of the invention to provide an attachment lens for use with a camera lens of a TV camera or a video camera equipped with a color separation optical system which can convert balance of axial chromatic aberrations of the camera lens according to glass types of the color separation optical system.

The foregoing objects of the invention are accomplished by an attachment lens optical system which is disposed between a camera lens and an imaging device to extend the overall focal length of the camera lens, the attachment lens optical system comprising, in order from the object side, a first lens group comprising of one of a biconcave lens element and a negative power meniscus lens element having a convex object side surface, a second lens group including a cemented doublet comprising a biconcave lens element and a biconvex lens element, a third lens group including at least a biconvex lens element, and a fourth lens group desirably with a negative power which includes at least a biconcave lens element.

The attachment lens optical system has a magnification $\beta$ between 1.1 and 1.3. where $\beta$ is the magnification of the attachment lens optical system.

The attachment lens optical system desirably satisfies the following condition:

$$0.1 \leq |f_1/f_4| \leq 0.7$$

where $f_1$ and $f_4$ are the overall focal lengths of the first and fourth lens groups, respectively.

Further, the attachment lens optical system desirably satisfies the following conditions:

$$1.8 < N_1$$

$$1.8 < N_{21}$$

$$v_{22} < v_{21}$$

$$v_{44} < 30$$

where $N_1$ and $N_{21}$ are the indices of refraction of one of a biconcave lens element and a negative power meniscus lens element having a convex object side surface within the first lens group and the biconcave lens element of the second lens group, respectively, and $v_{21}$, $v_{22}$ and $v_{44}$ are the Abbe numbers of the biconcave lens element of the second lens group, the biconvex lens element of the lens group and the biconcave lens element of the fourth lens group, respectively.

BRIEF DESCRIPTION OF THE DRAWINGS

The present invention will be clearly understood from the following description of embodiments thereof when read in conjunction with the following description in which:

FIG. 9 is a schematic side view of an attachment lens in accordance with a further embodiment of the invention;

FIGS. 10A, 10B, 10C and 10D are diagrams showing spherical aberrations, astigmatism, distortion and lateral chromatic aberration, respectively, of the television camera lens without the attachment lens which is at a wide-angle end or the shortest setting;

FIGS. 11A, 11B, 11C and 11D are diagrams showing spherical aberrations, astigmatism, distortion and lateral chromatic aberration, respectively, of the television camera lens including the attachment lens of FIG. 2;

FIGS. 13A, 13B, 14C and 14D are diagrams showing spherical aberrations, astigmatism, distortion and lateral chromatic aberration, respectively, of the television camera lens including the attachment lens of FIG. 4;

FIGS. 14A, 14B, 14C and 14D are diagrams showing spherical aberrations, astigmatism, distortion and lateral chromatic aberration, respectively, of the television camera lens including the attachment lens of FIG. 5;

FIGS. 17A, 17B, 17C and 17D are diagrams showing spherical aberrations, astigmatism, distortion and lateral chromatic aberration, respectively, of the television camera lens including the attachment lens of FIG. 8;

FIGS. 18A, 18B, 18C and 18D are diagrams showing spherical aberrations, astigmatism, distortion and lateral chromatic aberration, respectively, of the television camera lens including the attachment lens of FIG. 9;

DETAILED DESCRIPTION OF THE EMBODIMENTS

In the following description, prescription tables are provided to set forth lenses with parameters. In the prescription tables, the reference L followed by an Arabic numeral indicates the lens element progressively from the object end to the image end of the lens. The reference radius numbers R are the progressive lens surface radii. Positive surface radii are struck from the right of the lens surface on the optical axis X. Negative surface radii are struck from the left of the lens surface on the optical axis X. D is the axial distance between adjacent surfaces, i.e. the axial thickness of the lens element or the axial air space between adjacent lens elements. Ne is the index of refraction of the lens element. ν is the dispersion of the lens element as measured by the Abbe number.

Figure 1:
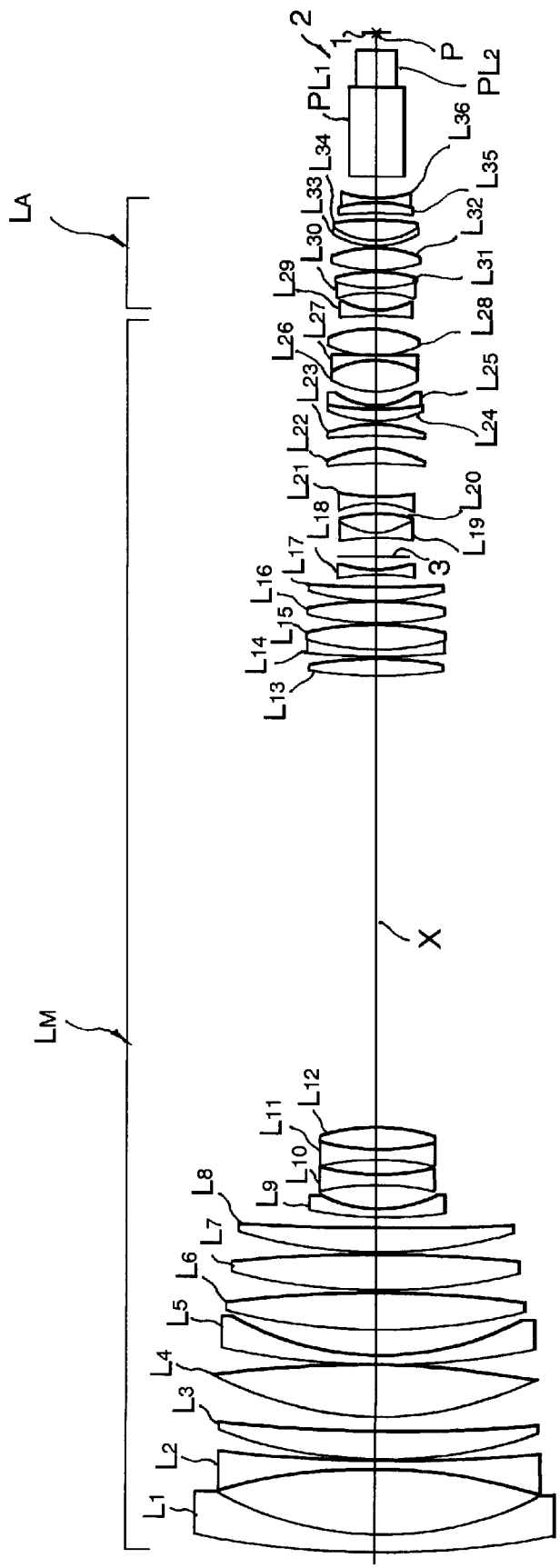
FIG. 1 is a schematic side view of a television lens system including an attachment lens of the invention.
Figure 19:
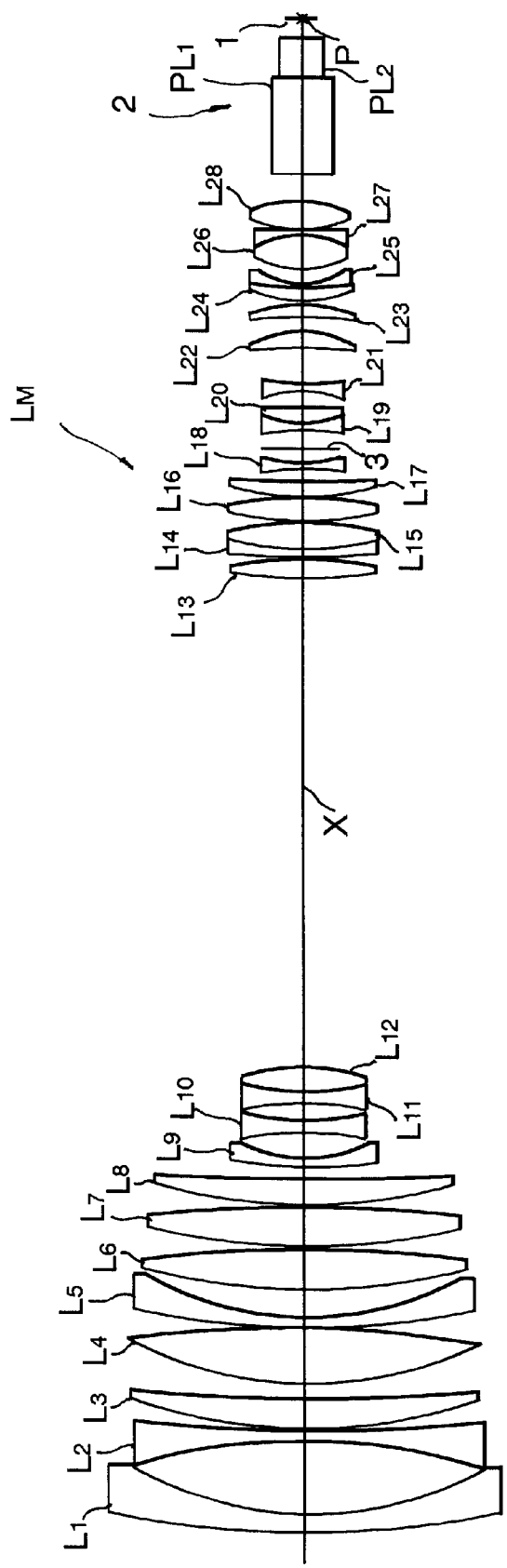
FIG. 19 is a schematic side view of a television camera lens shown in FIG. 1.
Figure 20:
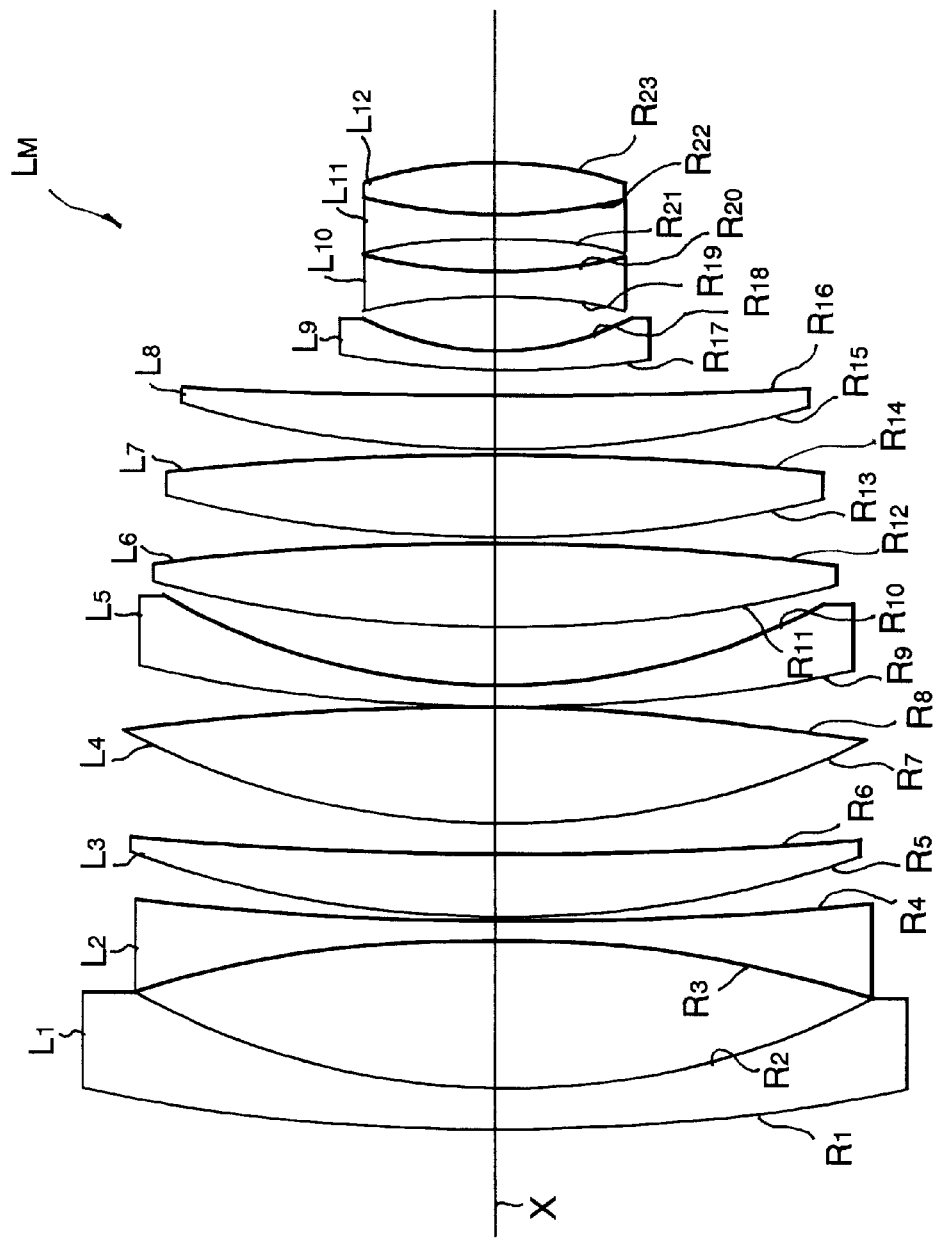
FIG. 20 is a schematic side view of a part of the television camera lens.
Figure 21:
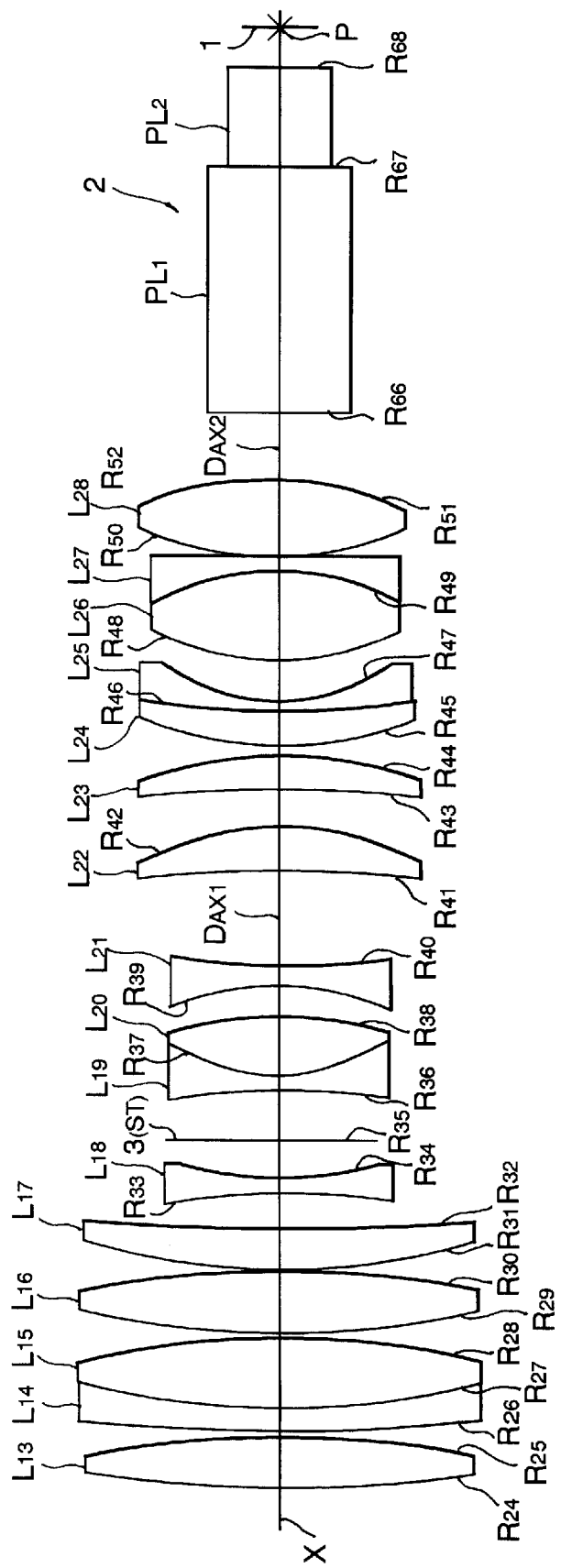
FIG. 21 is a schematic side view of the remaining part of the television camera lens.

Referring to the drawings in detail, and in particular to FIG. 1 which shows a television lens system including a main lens $L_M$ and an attachment lens LA, the television lens system is attached to a mount of a television camera which is provided with, for example, a color separation optical system 2. The main lens $L_M$ is a zoom lens comprising 28 lens elements $L_1$ through $L_{28}$ which are divided into a plurality of lens groups. Specified lens groups are movable relative to each other along the optical axis X to change the overall focal length f of the zoom lens during between the shortest setting (wide-angle end) as shown in FIG. 19 and the longest setting (telephoto end) as shown in FIGS. 20 and 21 so as thereby to provide desired zoom ratios. Another lens group is movable along the optical axis X during focusing to focus an image of an object on a focal plane 1 at a point P on the optical axis X. The zoom lens LM incorporates a shutter 3 at a specified axial position. The zoom lens LM is substantially described in Table I.

TABLE I

| Element | Radius of Curvature (mm) | Axial Distance Between Surfaces (mm) | N | ν |
|---|---|---|---|---|
| L1 | R1 = 557.674 | | | |
| | | 4.30 | 1.777250 | 49.6 |
| | R2 = 112.434 | | | |
| | | 28.00 | | |
| | R3 = −261.504 | | | |
| L2 | | 3.80 | 1.77250 | 49.6 |
| | R4 = 1511.372 | | | |
| | | 1.00 | | |
| | R5 = 220.911 | | | |
| L3 | | 10.00 | 1.84665 | 23.9 |
| | R6 = 1851.518 | | | |
| | | 3.50 | | |
| | R7 = 140.717 | | | |
| L4 | | 20.00 | 1.43875 | 94.9 |
| | R8 = −533.163 | | | |
| | | 0.20 | | |
| | R9 = 327.636 | | | |
| L5 | | 3.70 | 1.80517 | 25.4 |
| | R10 = 123.960 | | | |
| | | 10.00 | | |
| | R11 = 256.585 | | | |
| L6 | | 14.00 | 1.49700 | 81.6 |
| | R12 = −327.636 | | | |
| | | 0.20 | | |
| | R13 = 199.332 | | | |
| L7 | | 13.50 | 1.49700 | 81.6 |
| | R14 = −1588.801 | | | |
| | | 0.20 | | |
| | R15 = 178.311 | | | |
| L8 | | 10.50 | 1.58913 | 61.2 |
| | R16 = 1463.638 | | | |
| | | 129.26 | | |
| | R17 = 312.156 | | | |
| L9 | | 3.00 | 1.74100 | 52.6 |
| | R18 = 60.683 | | | |
| | | 9.00 | | |
| | R19 = −124.275 | | | |
| L10 | | 2.00 | 1.80609 | 40.9 |
| | R20 = 87.224 | | | |
| | | 7.00 | | |
| | R21 = −97.663 | | | |
| L11 | | 2.00 | 1.72916 | 54.7 |
| | R22 = 66.987 | | | |
| L12 | | 8.30 | 1.84665 | 23.9 |
| | R23 = −198.160 | | | |
| | | 11.24 | | |
| | R24 = 380.255 | | | |
| L13 | | 7.00 | 1.49700 | 81.6 |
| | R25 = −115.029 | | | |
| | | 0.20 | | |
| | R26 = 521.702 | | | |

TABLE I-continued

| Element | Radius of Curvature (mm) | Axial Distance Between Surfaces (mm) | N | ν |
|---|---|---|---|---|
| L14 | | 2.40 | 1.84665 | 23.9 |
| | R27 = 90.397 | | | |
| L15 | | 10.00 | 1.49700 | 81.6 |
| | R28 = 174.832 | | | |
| | | 0.20 | | |
| | R29 = 103.262 | | | |
| L16 | | 8.00 | 1.49700 | 81.6 |
| | R30 = −183.397 | | | |
| | | 0.20 | | |
| | R31 = 96.388 | | | |
| L17 | | 6.00 | 1.49700 | 81.6 |
| | R32 = 1604.787 | | | |
| | | 44.25 | | |
| | R33 = −88.209 | | | |
| L18 | | 2.00 | 1.77250 | 49.6 |
| | R34 = 97.939 | | | |
| | | 5.00 | | |
| ST | R35 = ∞ | | | |
| | | 6.50 | | |
| | R36 = −326.150 | | | |
| L19 | | 2.00 | 1.77250 | 49.6 |
| | R37 = 26.576 | | | |
| L20 | | 7.40 | 1.84665 | 23.9 |
| | R38 = −121.151 | | | |
| | | 5.30 | | |
| | R39 = −31.960 | | | |
| L21 | | 2.00 | 1.80400 | 46.6 |
| | R40 = −473.687 | | | |
| | | 13.20 | | |
| | R41 = −84.889 | | | |
| L22 | | 6.50 | 1.73399 | 51.5 |
| | R42 = −37.823 | | | |
| | | 4.00 | | |
| | R43 = −335.152 | | | |
| L23 | | 5.00 | 1.51680 | 64.2 |
| | R44 = −58.320 | | | |
| | | 0.20 | | |
| | R45 = 47.132 | | | |
| L24 | | 5.00 | 1.51741 | 52.4 |
| | R46 = 76.556 | | | |
| L25 | | 2.00 | 1.83480 | 42.7 |
| | R47 = 34.723 | | | |
| | | 5.00 | | |
| | R48 = 47.849 | | | |
| L26 | | 12.30 | 1.51680 | 64.2 |
| | R49 = −28.721 | | | |
| L27 | | 2.00 | 1.80517 | 25.4 |
| | R50 = −384.461 | | | |
| | | 0.20 | | |
| | R51 = 81.724 | | | |
| L28 | | 9.70 | 1.51680 | 64.2 |
| | R52 = −46.855 | | | |
| | | DAX1 | | |
| (L29–L36) | | | | |
| | | DAX2 | | |
| | R66 = ∞ | | | |
| LP1 | | 33.00 | 1.58267 | 46.5 |
| | R67 = ∞ | | | |
| LP2 | | 13.20 | 1.51633 | 64.0 |
| | R68 = ∞ | | | |

In Table I, the axial distances $D_{AX1}$ and $D_{AX2}$ are different according to attachment lenses and shown later.

FIGS. 10A, 10B, 10C and 10D show respectively spherical aberrations for g- and d-lines, astigmatism on sagittal (S) and tangential (T) planes, distortion and lateral chromatic aberration of the main lens $L_M$ at the wide-angle end.

The attachment lens $L_A$ functions to increase the focal length of the zoom lens LM and balance longitudinal aberrations of both main lens $L_M$ and color separation prism 2.

Figure 2:
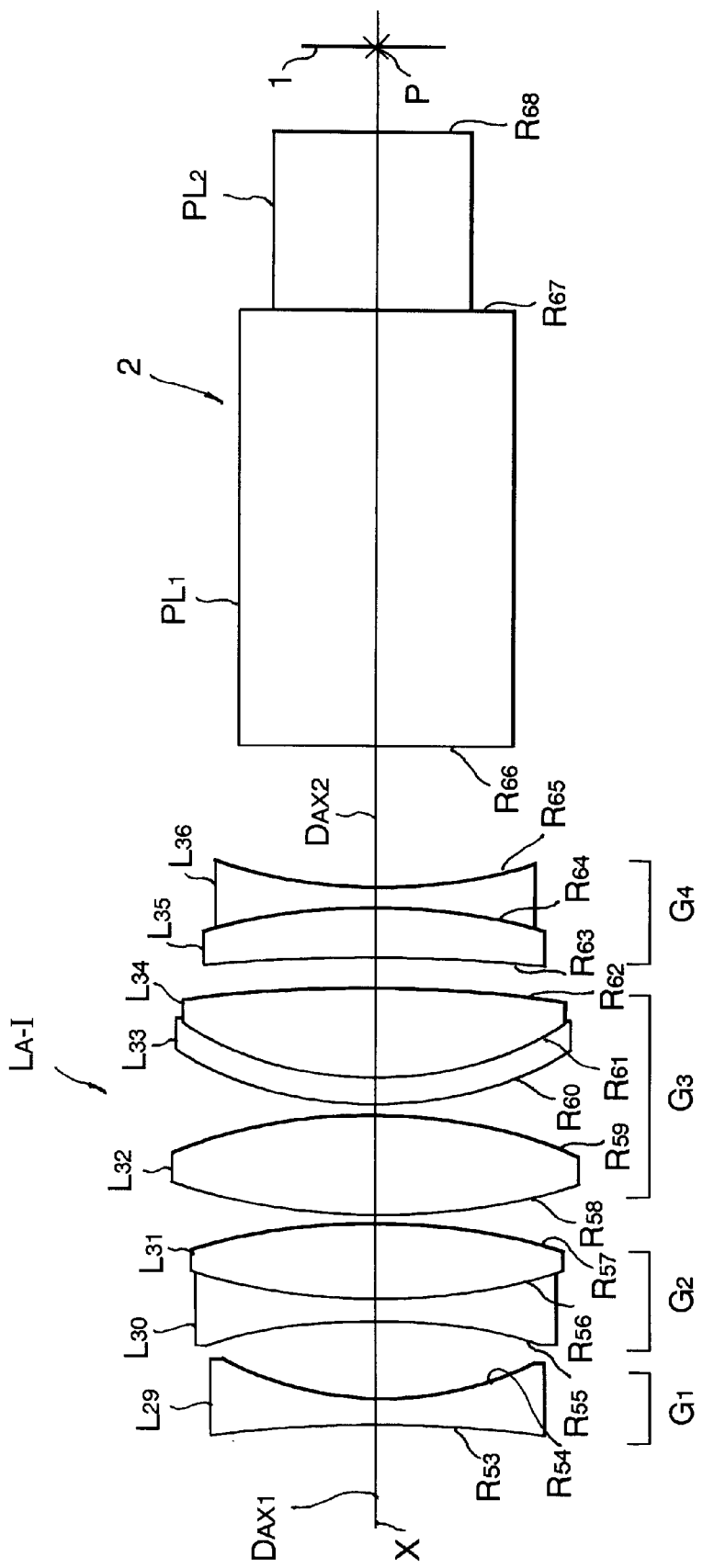
FIG. 2 is a schematic side view of an attachment lens in accordance with an embodiment of the invention.

As shown in FIG. 2, the attachment lens $L_A$ according to a first embodiment of the invention includes a negative power first lens group $G_1$, a second lens group $G_2$, a positive power third lens group $G_3$, and a negative power cemented fourth lens group $G_4$, arranged in order from the image end. Specifically, the first lens group $G_1$ comprises a biconcave lens element $L_{29}$ having a strong curvature at an image side surface. The second lens group $G_2$ includes a cemented doublet comprising a biconcave lens element $L_{30}$ having a strong curvature at a object side surface and a biconvex lens element $L_{31}$ having a strong curvature at an image side surface. The third lens group G3 comprises a biconvex lens element having a strong curvature at an image side surface and a cemented doublet including a negative power meniscus lens element $L_{33}$ having a convex object side surface and a biconvex lens element $L_{34}$ having a strong curvature at a object side surface. The fourth lends group $G_4$ includes a cemented doublet comprising a positive power meniscus lens element $L_{35}$ having a convex image side surface and a biconcave lens element $L_{36}$ having a strong curvature at a object side surface. The attachment lens $L_A$ thus designed has a long back-focal distance and a long distance to the exit pupil, which is always desirable not only to provide a margin for laying out the color separation prism assembly 2 and filters between the attachment lens $L_A$ and the image plane of the television camera but also to prevent an occurrence of color shading.

The attachment lens $L_A$ is further designed and adapted to have a magnification β satisfying the following condition (1):

$$1.1 \leq \beta < 1.3 \tag{1}$$

While the television lens system for use with a television camera having a color separation prism assembly which comprises a plurality of prisms made of different glasses has been conventionally necessary to include a main lens $L_M$ designed to suitably balance longitudinal chromatic aberrations for the respective glasses of the prisms, installation of the attachment lens $L_A$ having an equi-magnification as a part of a television lens system between a main lens $L_M$ and the television camera changes the balance of longitudinal chromatic aberrations of the same main lens $L_M$, which makes the same main lens $L_M$ fit suitably for various television cameras having different optical systems without changing optical dimensions of the main lens $L_M$.

The attachment lens $L_A$ are designed and adapted to satisfy the following conditions (2) through (6):

$$0.1 \leq |f_1/f_4| \leq 0.7 \tag{2}$$

$$1.8 < N_1 \tag{3}$$

$$1.8 < N_{21} \tag{4}$$

$$\nu_{22} < \nu_{21} \tag{5}$$

$$\nu_{44} < 30 \tag{6}$$

where $f_1$ is the overall focal length of the lens group $G_1$;
$f_4$ is the overall focal length of the lens group $G_4$;
$N_1$ is the index of refraction of one of a biconcave lens element and a negative power meniscus lens element having a convex object side surface within the lens group $G_1$;
$N_{21}$ is the index of refraction of the biconcave lens element $L_{30}$ of the lens group $G_2$;
$\nu_{21}$ is the Abbe number of the biconcave lens element $L_{30}$ of the lens group $G_2$;
$\nu_{22}$ is the Abbe number of the biconvex lens element $L_{31}$ of the lens group $G_2$;

$\nu_{44}$ is the Abbe number of the biconcave lens element $L_{36}$ of the lens group $G_4$;

Satisfaction of the condition (2) by the negative power lens group $G_4$ provides a suitable axial distance to the exit pupil. If the lower limit is exceeded, the axial distance to the exit pupil is too short to prevent an occurrence of color shading. On the other hand, if the upper limit is exceeded, while the axial distance to the exit pupil is sufficiently long, the lens group $G_4$ has a negative power too strong to prevent aggravation of balancing longitudinal chromatic aberrations due to an increase in magnification.

The conditions (3) and (4) are necessary to shift the Petzval sum toward a minus value by providing an overall negative power of the attachment lens $L_A$ so as to prevent or significantly reduce aggravation of field curvature. If the limits are exceeded, the Petzval sum becomes minus in excess, leading aggravation of field curvature which reduces the performance of the attachment lens $L_A$. The conditions (5) and (6) are necessary for properly balancing axial and lateral chromatic aberrations. If the condition (5) is unsatisfied, the axial chromatic aberration for blue light rays is over corrected to focus blue light rays beyond the focal plane, and the axial chromatic aberration for red light rays is under corrected. If the condition (6) is unsatisfied, the lateral chromatic aberrations are unbalanced. Specifically, the lateral chromatic aberration for blue light rays is under corrected, and the lateral chromatic aberration for red light rays is over corrected, which cause a color blur on an image.

The attachment lens $L_A$-I according to the first embodiment is substantially described in Table II.

TABLE II

| Element | Radius of Curvature (mm) | Axial Distance Between Surfaces (mm) | N | ν |
|---|---|---|---|---|
| L29 | R53 = −168.152 | | | |
| | | 2.00 | 1.88299 | 40.9 |
| | R54 = 28.154 | | | |
| | | 6.00 | | |
| | R55 = −37.612 | | | |
| L30 | | 2.00 | 1.88299 | 40.9 |
| | R56 = 64.825 | | | |
| L31 | | 5.00 | 1.84665 | 23.9 |
| | R57 = −44.521 | | | |
| | | 0.80 | | |
| | R58 = 56.895 | | | |
| L32 | | 8.00 | 1.48749 | 70.4 |
| | R59 = −38.251 | | | |
| | | 0.80 | | |
| | R60 = 33.028 | | | |
| L33 | | 2.00 | 1.80501 | 39.6 |
| | R61 = 29.858 | | | |
| L34 | | 6.50 | 1.48749 | 70.4 |
| | R62 = −97.450 | | | |
| | | 2.00 | | |
| | R63 = −219.587 | | | |
| L35 | | 4.30 | 1.48749 | 70.4 |
| | R64 = −63.886 | | | |
| L36 | | 2.00 | 1.80517 | 25.4 |
| | R65 = 83.853 | | | |

| | | Parameters | | | |
|---|---|---|---|---|---|
| β | [f1/f4] | N1 | N21 | ν22 | ν21 | ν44 |
| 1.266 | 0.461 | 1.88299 | 1.88229 | 40.9 | 23.9 | 25.4 |

As apparent from the Table II, the attachment lens $L_A$-I satisfies the conditions (1) through (6) set forth.

FIGS. 11A, 11B, 11C and 11D show respectively spherical aberrations for g- and d-lines, astigmatism on sagittal (S) and tangential (T) planes, distortion and lateral chromatic aberration of the attachment lens $L_A$-I. As apparent, the attachment lens $L_A$-I suitably balances the aberrations of the lens system.

Figure 3:
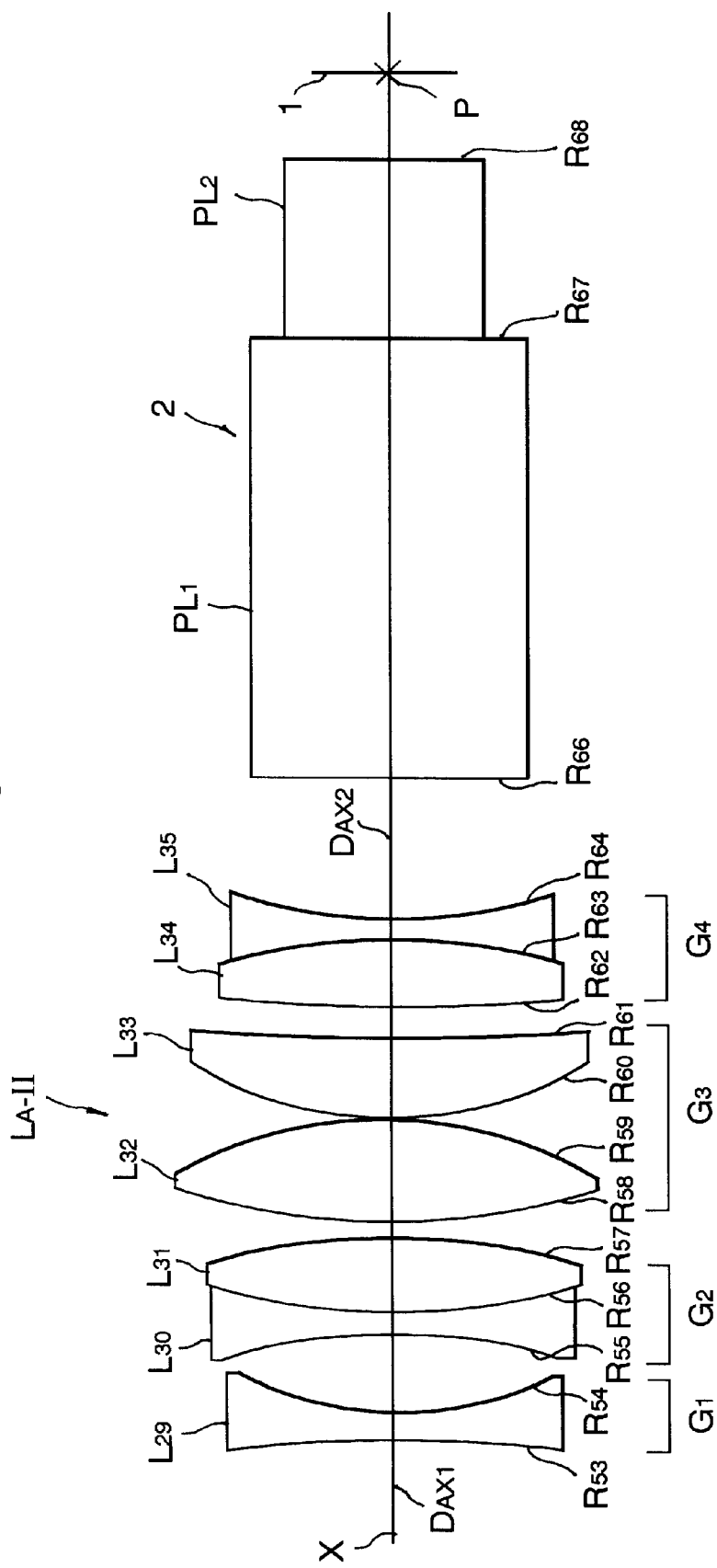
FIG. 3 is a schematic side view of an attachment lens in accordance with another embodiment of the invention.

As shown in FIG. 3, the attachment lens $L_A$-II according to a second embodiment of the invention includes a negative power first lens group $G_1$, a second lens group $G_2$, a positive power third lens group $G_3$, and a negative power cemented fourth lens group $G_4$, arranged in order from the image end. Specifically, the first lens group $G_1$ comprises a biconcave lens element $L_{29}$ having a strong curvature at an image side surface. The second lens group $G_2$ includes a cemented doublet comprising a biconcave lens element $L_{30}$ having a strong curvature at a object side surface and a biconvex lens element $L_{31}$ having a strong curvature at an image side surface. The third lens group $G_3$ comprises a biconvex lens element $L_{32}$ having a strong curvature at an image side surface and a positive power meniscus lens element $L_{33}$ having a convex object side surface. The fourth lends group $G_4$ includes a cemented doublet comprising a biconvex lens element $L_{34}$ having a strong curvature at an image side surface and a biconcave lens element $L_{35}$ having a strong curvature at an image side surface.

The attachment lens $L_A$-II according to the second embodiment is substantially described in Table III.

TABLE III

| Element | Radius of Curvature (mm) | Axial Distance Between Surfaces (mm) | N | ν |
|---|---|---|---|---|
| L29 | R53 = −109.703 | | | |
| | | 2.00 | 1.88299 | 40.9 |
| | R54 = 26.855 | | | |
| | | 6.00 | | |
| | R55 = −41.529 | | | |
| L30 | | 2.00 | 1.88299 | 40.9 |
| | R56 = 67.963 | | | |
| L31 | | 5.00 | 1.84665 | 23.9 |
| | R57 = −45.753 | | | |
| | | 2.00 | | |
| | R58 = 64.042 | | | |
| L32 | | 8.00 | 1.48749 | 70.4 |
| | R59 = −31.375 | | | |
| | | 0.20 | | |
| | R60 = 30.963 | | | |
| L33 | | 6.50 | 1.48749 | 70.4 |
| | R61 = 1122.385 | | | |
| | | 2.00 | | |
| | R62 = 218.113 | | | |
| L34 | | 4.30 | 1.48749 | 70.4 |
| | R63 = −93.597 | | | |
| L35 | | 2.00 | 1.80517 | 25.4 |
| | R64 = 67.116 | | | |

| | | Parameters | | | |
|---|---|---|---|---|---|
| β | [f1/f4] | N1 | N21 | ν22 | ν21 | ν44 |
| 1.183 | 0.317 | 1.88299 | 1.88229 | 40.9 | 23.9 | 25.4 |

As apparent from the Table III, the attachment lens $L_A$-II satisfies the conditions (1) through (6) set forth.

FIGS. 12A, 12B, 12C and 12D show respectively spherical aberrations for g- and d-lines, astigmatism on sagittal (S) and tangential (T) planes, distortion and lateral chromatic aberration of the attachment lens $L_A$-II. As apparent, the attachment lens $L_A$-II suitably balances the aberrations of the lens system.

Figure 4:
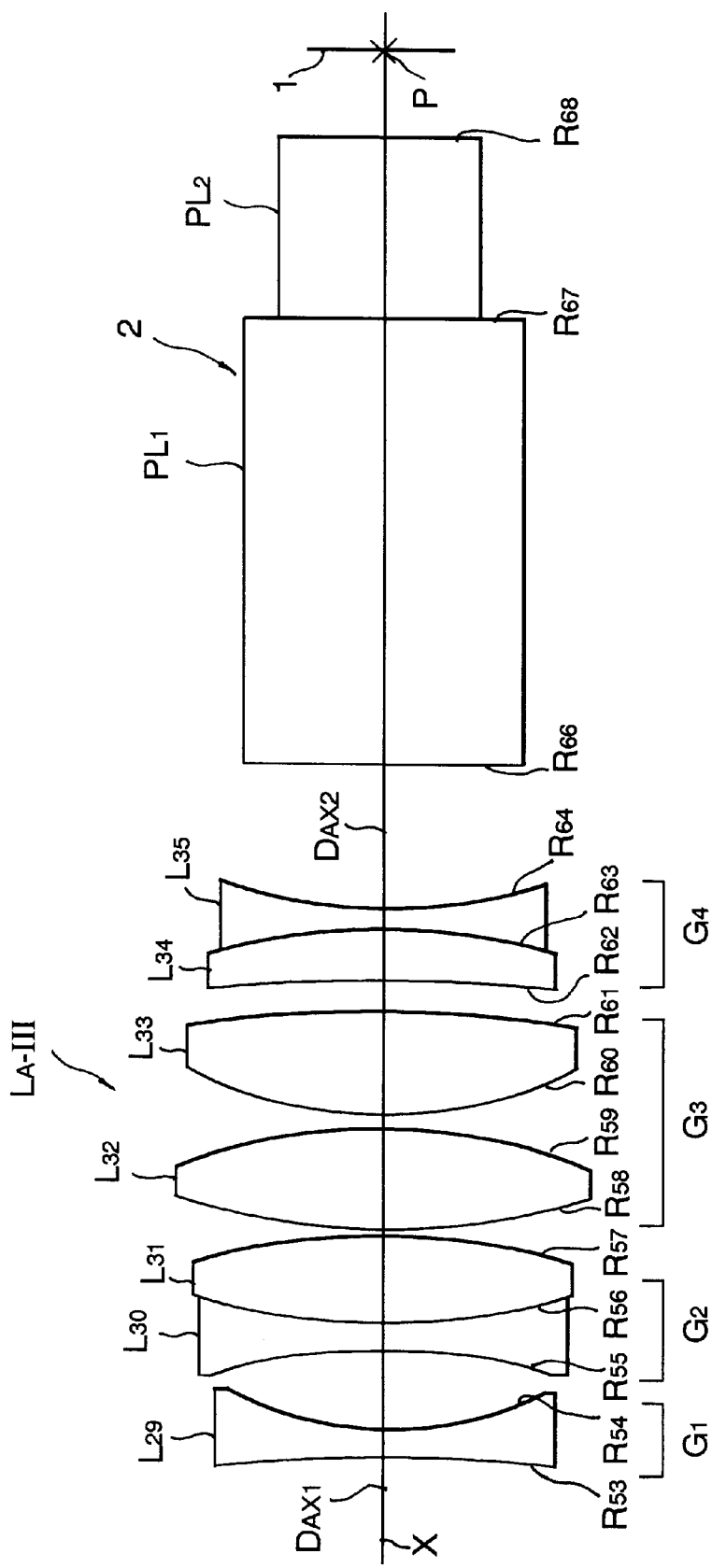
FIG. 4 is a schematic side view of an attachment lens in accordance with another embodiment of the invention.

FIG. 4 shows an attachment lens $L_A$-III according to a third embodiment of the invention. The attachment lens $L_A$-III includes a negative power first lens group $G_1$, a second lens group $G_2$, a positive power third lens group $G_3$, and a negative power cemented fourth lens group $G_4$, arranged in order from the image end. Specifically, the first lens group $G_1$ comprises a biconcave lens element $L_{29}$ having a strong image side surface. The second lens group $G_2$ includes a cemented doublet comprising a biconcave lens element $L_{30}$ having a strong curvature at a object side surface and a biconvex lens element $L_{31}$ having a strong curvature at an image side surface. The third lens group $G_3$ comprises a biconvex lens element $L_{32}$ having a strong curvature at an image side surface and a biconvex lens element $L_{33}$ having a strong curvature at a object side surface. The fourth lends group $G_4$ includes a cemented doublet comprising a positive power meniscus lens element $L_{34}$ having a convex image side surface and a biconcave lens element $L_{35}$ having a strong curvature at an image side surface.

The attachment lens $L_A$-III according to the third embodiment is substantially described in Table IV.

TABLE IV

| Element | Radius of Curvature (mm) | Axial Distance Between Surfaces (mm) | N | ν |
|---|---|---|---|---|
| L29 | R53 = −179.209 | | | |
| | | 2.00 | 1.88299 | 40.9 |
| | R54 = 28.735 | | | |
| | | 6.00 | | |
| | R55 = −42.892 | | | |
| L30 | | 2.00 | 1.88299 | 40.9 |
| | R56 = 60.094 | | | |
| L31 | | 6.00 | 1.84665 | 23.9 |
| | R57 = −48.319 | | | |
| | | 0.80 | | |
| | R58 = 56.589 | | | |
| L32 | | 8.00 | 1.48749 | 70.4 |
| | R59 = −40.766 | | | |
| | | 0.80 | | |
| | R60 = 32.613 | | | |
| L33 | | 7.00 | 1.48749 | 70.4 |
| | R61 = −101.656 | | | |
| | | 2.00 | | |
| | R62 = −232.063 | | | |
| L34 | | 3.80 | 1.48749 | 70.4 |
| | R63 = −78.505 | | | |
| L35 | | 2.00 | 1.80517 | 25.4 |
| | R64 = 66.304 | | | |

| | | Parameters | | | |
|---|---|---|---|---|---|
| β | [f1/f4] | N1 | N21 | ν22 | ν21 | ν44 |
| 1.253 | 0.515 | 1.88299 | 1.88229 | 40.9 | 23.9 | 25.4 |

As apparent from the Table IV, the attachment lens $L_A$-III satisfies the conditions (1) through (6) set forth.

FIGS. 13A, 13B, 13C and 13D show respectively spherical aberrations for g- and d-lines, astigmatism on sagittal (S) and tangential (T) planes, distortion and lateral chromatic aberration of the attachment lens $L_A$-III. As apparent, the attachment lens $L_A$-III suitably balances the aberrations of the lens system.

Figure 5:
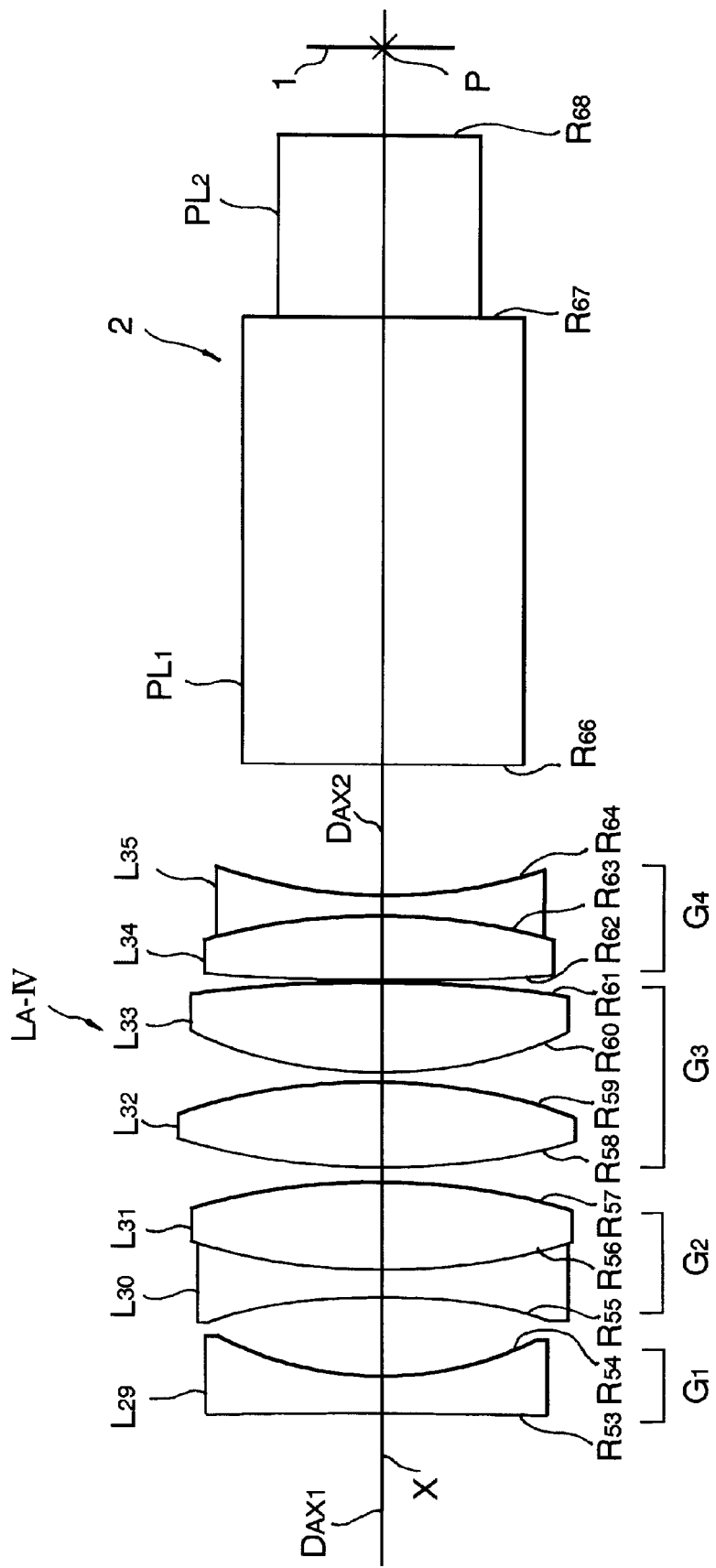
FIG. 5 is a schematic side view of an attachment lens in accordance with another embodiment of the invention.

FIG. 5 shows an attachment lens $L_A$-IV according to a fourth embodiment of the invention. The attachment lens $L_A$-IV includes a negative power first lens group $G_1$, a second lens group $G_2$, a positive power third lens group $G_3$, and a negative power cemented fourth lens group $G_4$, arranged in order from the image end. Specifically, the first lens group $G_1$ comprises a negative power meniscus lens element $L_{29}$ having a concave image side surface. The second lens group $G_2$ includes a cemented doublet comprising a biconcave lens element $L_{30}$ having a strong curvature at a object side surface and a biconvex lens element $L_{31}$ having a strong curvature at an image side surface. The third lens group $G_3$ comprises a biconvex lens element $L_{32}$ having a strong curvature at a object side surface and a biconvex lens element $L_{33}$ having a strong curvature at a object side surface. The fourth lends group $G_4$ includes a cemented doublet comprising a biconvex lens element $L_{34}$ having a strong curvature at an image side surface and a biconcave lens element $L_{35}$ having a strong curvature at an image side surface.

The attachment lens $L_A$-IV according to the fourth embodiment is substantially described in Table V.

TABLE V

| Element | Radius of Curvature (mm) | Axial Distance Between Surfaces (mm) | N | ν |
|---|---|---|---|---|
| L29 | R53 = 2797.373 | | | |
| | | 2.00 | 1.83480 | 42.7 |
| | R54 = 26.378 | | | |
| | | 6.00 | | |
| | R55 = −37.824 | | | |
| L30 | | 2.00 | 1.88299 | 40.9 |
| | R56 = 55.071 | | | |
| L31 | | 6.50 | 1.84665 | 23.9 |
| | R57 = −46.020 | | | |
| | | 0.80 | | |
| | R58 = 57.904 | | | |
| L32 | | 6.00 | 1.59240 | 68.3 |
| | R59 = −76.254 | | | |
| | | 0.80 | | |
| | R60 = 33.833 | | | |
| L33 | | 6.50 | 1.48749 | 70.2 |
| | R61 = −95.143 | | | |
| | | 0.20 | | |
| | R62 = 147.899 | | | |
| L34 | | 3.80 | 1.48749 | 70.2 |
| | R63 = −106.164 | | | |
| L35 | | 2.00 | 1.80517 | 25.4 |
| | R64 = 50.934 | | | |

| | | Parameters | | | |
|---|---|---|---|---|---|
| β | [f1/f4] | N1 | N21 | ν22 | ν21 | ν44 |
| 1.229 | 0.489 | 1.83480 | 1.88229 | 40.7 | 23.9 | 25.4 |

As apparent from the Table V, the attachment lens $L_A$-IV satisfies the conditions (1) through (6) set forth.

FIGS. 14A, 14B, 14C and 14D show respectively spherical aberrations for g- and d-lines, astigmatism on sagittal (S) and tangential (T) planes, distortion and lateral chromatic aberration of the attachment lens $L_A$-IV. As apparent, the attachment lens $L_A$-IV suitably balances the aberrations of the lens system.

Figure 6:
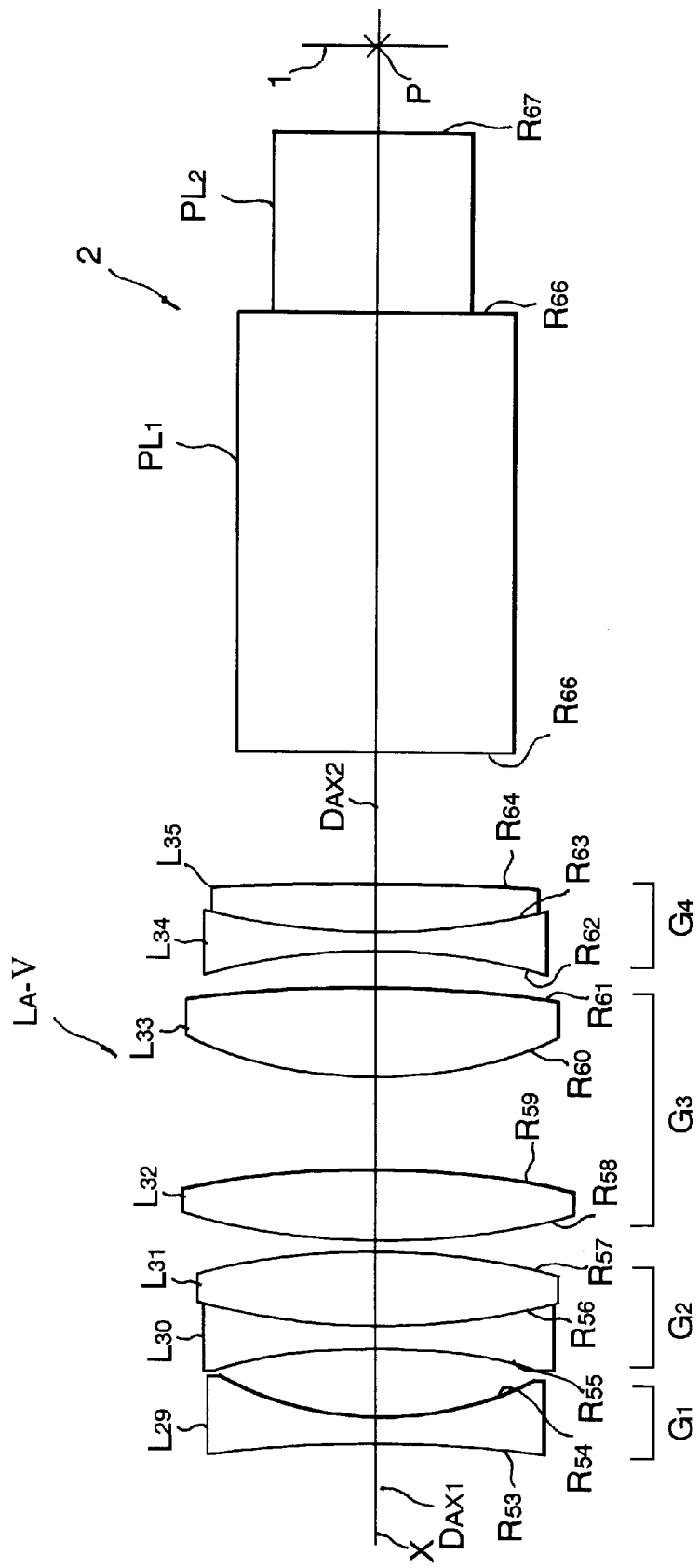
FIG. 6 is a schematic side view of an attachment lens in accordance with another embodiment of the invention.

FIG. 6 shows an attachment lens $L_A$-V according to a fifth embodiment of the invention. The attachment lens $L_A$-V includes a negative power first lens group $G_1$, a second lens group $G_2$, a positive power third lens group $G_3$, and a negative power cemented fourth lens group $G_4$, arranged in order from the image end. Specifically, the first lens group $G_1$ comprises a negative power meniscus lens element $L_{29}$ having a concave image side surface. The second lens group $G_2$ includes a cemented doublet comprising a biconcave lens element $L_{30}$ having a strong curvature at a object side surface and a biconvex lens element $L_{31}$ having a strong curvature at a object side surface. The third lens group $G_3$ comprises a biconvex lens element $L_{32}$ having a strong curvature at a object side surface and a biconvex lens element $L_{33}$ having a strong curvature at a object side surface. The fourth lends group $G_4$ includes a doublet comprising a biconcave lens element $L_{34}$ having a strong curvature at an image side surface and a biconvex lens element $L_{35}$ having a strong curvature at a object side surface.

The attachment lens $L_A$-V according to the fifth embodiment is substantially described in Table VI.

TABLE VI

| Element | Radius of Curvature (mm) | Axial Distance Between Surfaces (mm) | N | ν |
|---|---|---|---|---|
| L29 | R53 = 492.588 | | | |
| | | 2.00 | 1.88299 | 40.7 |
| | R54 = 25.720 | | | |
| | | 5.50 | | |
| | R55 = −48.387 | | | |
| L30 | | 2.00 | 1.88299 | 40.7 |
| | R56 = 58.584 | | | |
| L31 | | 5.00 | 1.84665 | 23.9 |
| | R57 = −69.231 | | | |
| | | 0.60 | | |
| | R58 = 57.189 | | | |
| L32 | | 5.30 | 1.77250 | 49.6 |
| | R59 = −122.978 | | | |
| | | 7.48 | | |
| | R60 = 52.209 | | | |
| L33 | | 6.20 | 1.52249 | 59.8 |
| | R61 = −61.879 | | | |
| | | 2.00 | | |
| | R62 = −133.222 | | | |
| L34 | | 2.00 | 1.80517 | 25.4 |
| | R63 = 65.902 | | | |
| L35 | | 3.23 | 1.48749 | 70.2 |
| | R64 = −368.221 | | | |

Parameters

| β | [f1/f4] | N1 | N21 | ν22 | ν21 | ν44 |
|---|---|---|---|---|---|---|
| 1.254 | 0.274 | 1.88299 | 1.88229 | 40.7 | 23.9 | 25.4 |

TABLE VII

| Element | Radius of Curvature (mm) | Axial Distance Between Surfaces (mm) | N | ν |
|---|---|---|---|---|
| L29 | R53 = 410.081 | | | |
| | | 2.00 | 1.88299 | 40.7 |
| | R54 = 24.795 | | | |
| | | 5.50 | | |
| | R55 = −40.951 | | | |
| L30 | | 2.00 | 1.88299 | 40.7 |
| | R56 = 65.684 | | | |
| L31 | | 5.00 | 1.84665 | 23.9 |
| | R57 = −61.170 | | | |
| | | 0.60 | | |
| | R58 = 65.602 | | | |
| L32 | | 5.30 | 1.77250 | 49.6 |
| | R59 = −135.616 | | | |
| | | 7.06 | | |
| | R60 = 49.875 | | | |
| L33 | | 6.20 | 1.52249 | 59.8 |
| | R61 = −59.794 | | | |
| | | 0.20 | | |
| | R62 = 127.338 | | | |
| L34 | | 8.33 | 1.48749 | 70.2 |
| | R63 = −62.705 | | | |
| L35 | | 2.00 | 1.80517 | 25.4 |
| | R64 = 112.935 | | | |

Parameters

| β | [f1/f4] | N1 | N21 | ν22 | ν21 | ν44 |
|---|---|---|---|---|---|---|
| 1.253 | 0.243 | 1.88299 | 1.88229 | 40.7 | 23.9 | 25.4 |

As apparent from the Table VI, the attachment lens $L_A$-V satisfies the conditions (1) through (6) set forth.

FIGS. 15A, 15B, 15C and 15D show respectively spherical aberrations for g- and d-lines, astigmatism on sagittal (S) and tangential (T) planes, distortion and lateral chromatic aberration of the attachment lens $L_A$-V. As apparent, the attachment lens $L_A$-V suitably balances the aberrations of the lens system.

Figure 7:
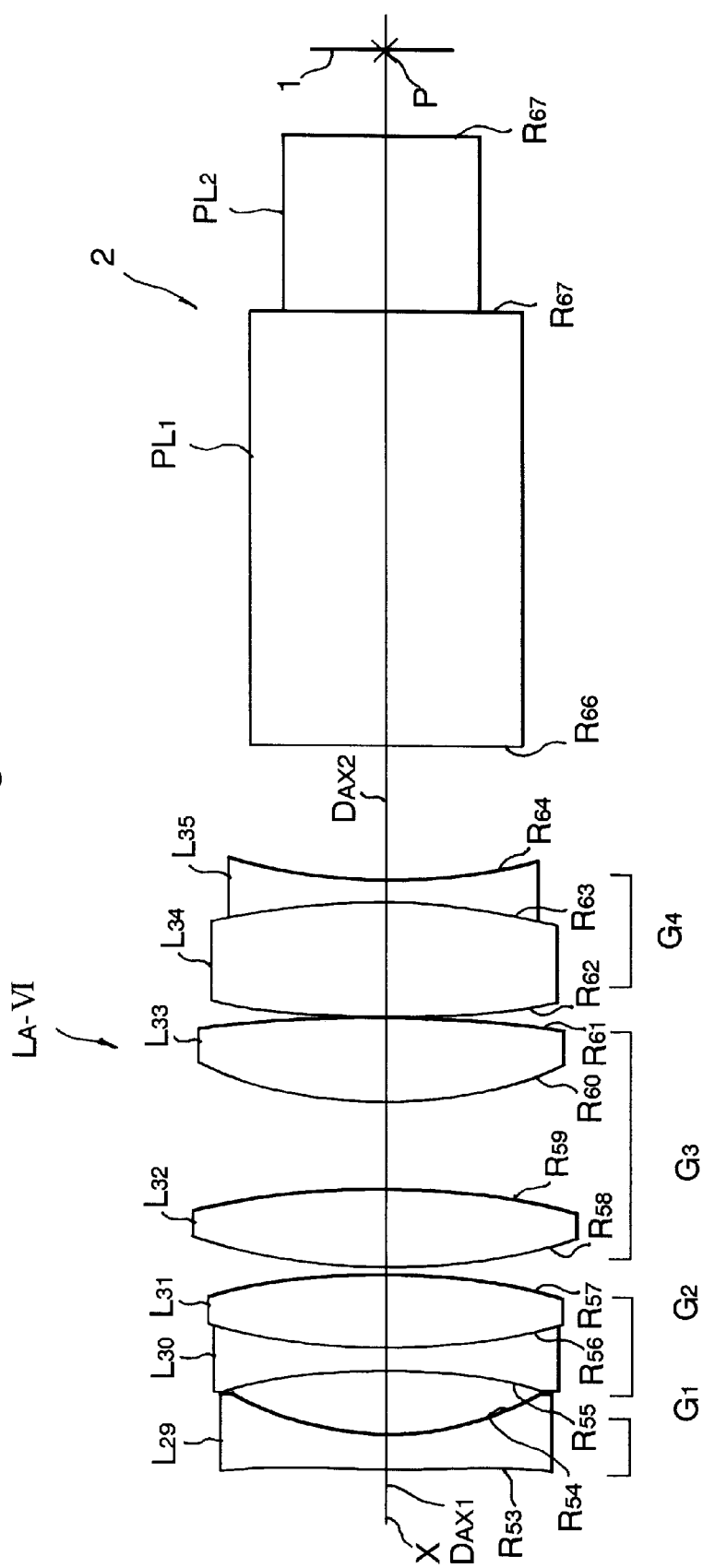
FIG. 7 is a schematic side view of an attachment lens in accordance with another embodiment of the invention.

FIG. 7 shows an attachment lens $L_A$-VI according to a sixth embodiment of the invention. The attachment lens $L_A$-VI includes a negative power first lens group $G_1$, a second lens group $G_2$, a positive power third lens group $G_3$, and a negative power cemented fourth lens group $G_4$, arranged in order from the image end. Specifically, the first lens group $G_1$ comprises a negative power meniscus lens element $L_{29}$ having a concave image side surface. The second lens group $G_2$ includes a cemented doublet comprising a biconcave lens element $L_{30}$ having a strong curvature at a object side surface and a biconvex lens element $L_{31}$ having a strong curvature at an image side surface. The third lens group $G_3$ comprises a biconvex lens element $L_{32}$ having a strong curvature at an image side surface and a biconvex lens element $L_{33}$ having a strong curvature at a object side surface. The fourth lends group $G_4$ includes a cemented doublet comprising a biconvex lens element $L_{34}$ having a strong curvature at an image side surface and a biconcave lens element $L_{35}$ having a strong curvature at a object side surface.

The attachment lens $L_A$-VI according to the sixth embodiment is substantially described in Table VII As apparent from the Table VI, the attachment lens $L_A$-VI satisfies the conditions (1) through (6) set forth.

FIGS. 16A, 16B, 16C and 16D show respectively spherical aberrations for g- and d-lines, astigmatism on sagittal (S) and tangential (T) planes, distortion and lateral chromatic aberration of the attachment lens $L_A$-VI. As apparent, the attachment lens $L_A$-VI suitably balances the aberrations of the lens system.

Figure 8:
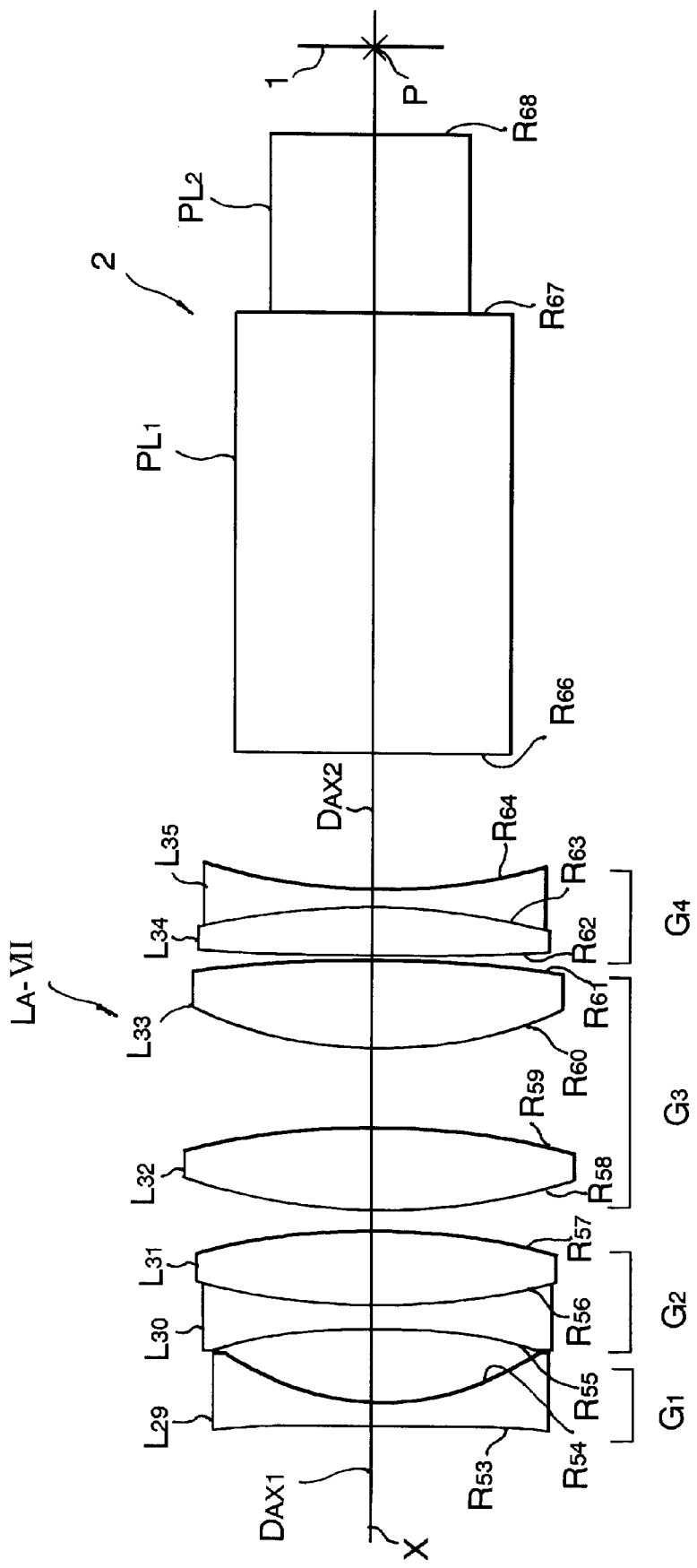
FIG. 8 is a schematic side view of an attachment lens in accordance with another embodiment of the invention.
Figures 12A, 12B, 12C, 12D:
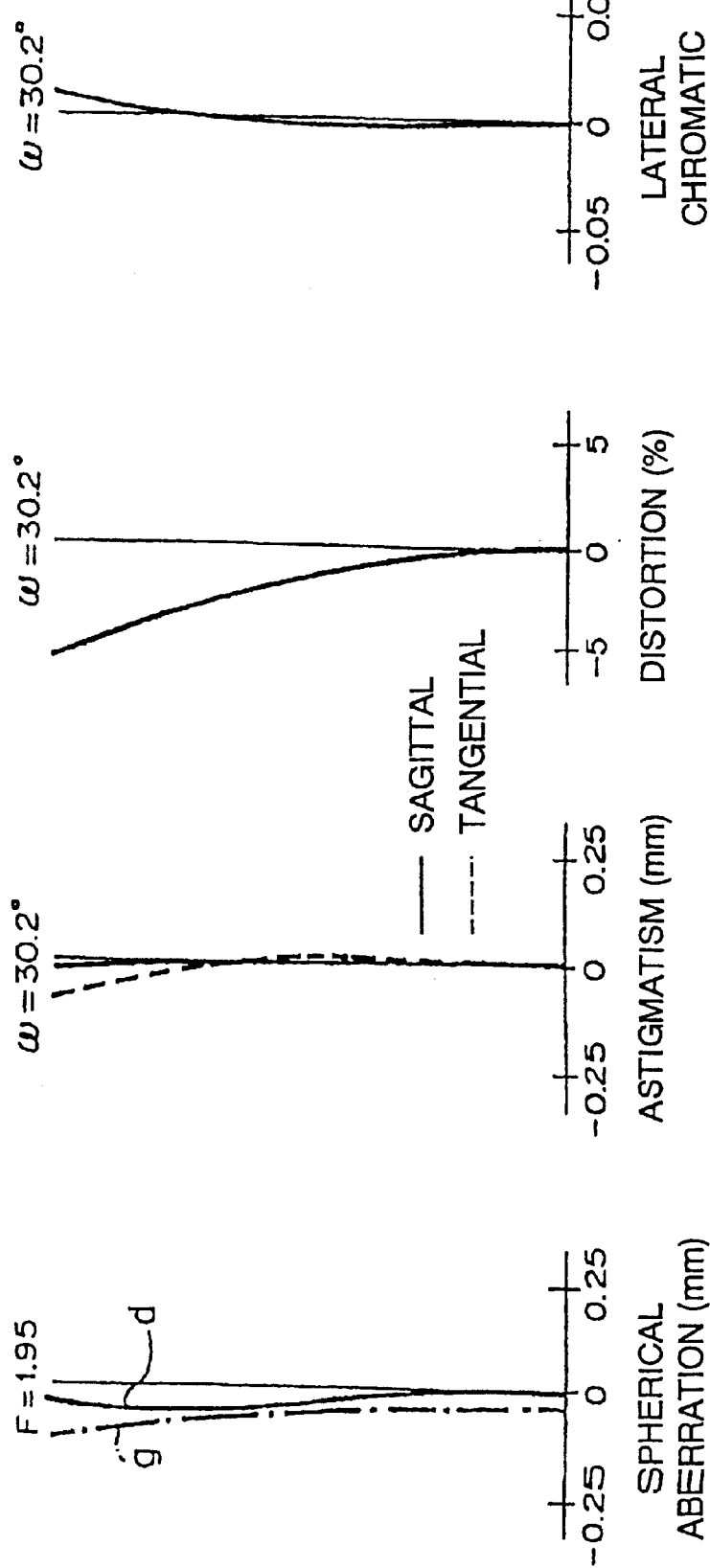
FIGS. 12A, 12B, 12C and 12D are diagrams showing spherical aberrations, astigmatism, distortion and lateral chromatic aberration, respectively, of the television camera lens including the attachment lens of FIG. 3.
Figures 15A, 15B, 15C, 15D:
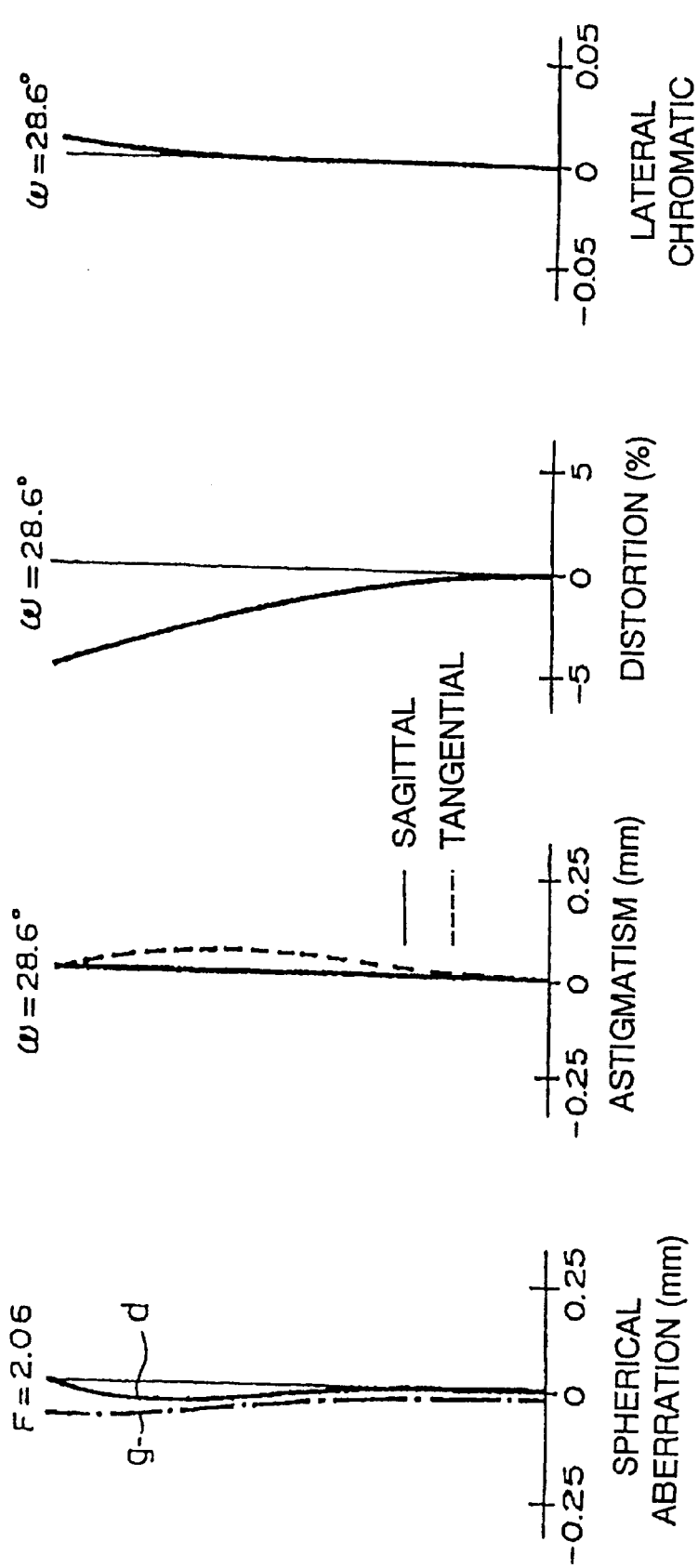
FIGS. 15A, 15B, 15C and 15D are diagrams showing spherical aberrations, astigmatism, distortion and lateral chromatic aberration, respectively, of the television camera lens including the attachment lens of FIG. 6.
Figures 16A, 16B, 16C, 16D:
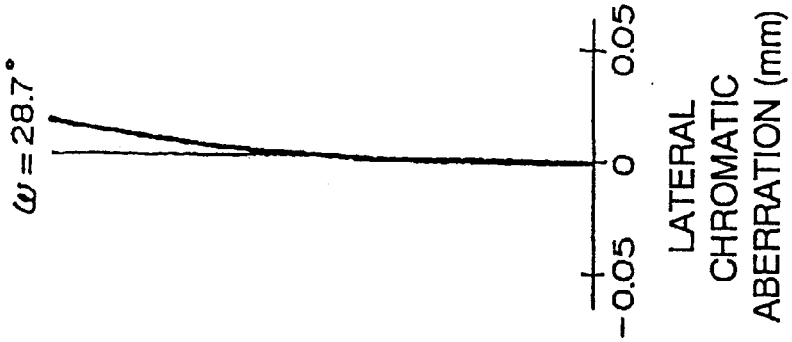
FIGS. 16A, 16B, 16C and 16D are diagrams showing spherical aberrations, astigmatism, distortion and lateral chromatic aberration, respectively, of the television camera lens including the attachment lens of FIG. 7.

FIG. 8 shows an attachment lens $L_A$-VII according to a seventh embodiment of the invention. The attachment lens $L_A$-VII includes a negative power first lens group $G_1$, a second lens group $G_2$, a positive power third lens group $G_3$, and a negative power cemented fourth lens group $G_4$, arranged in order from the image end. Specifically, the first lens group $G_1$ comprises a negative power meniscus lens element $L_{29}$ having a concave image side surface. The second lens group $G_2$ includes a cemented doublet comprising a biconcave lens element $L_{30}$ having a strong curvature at a object side surface and a biconvex lens element $L_{31}$ having a strong curvature at an image side surface. The third lens group $G_3$ comprises a biconvex lens element $L_{32}$ having a strong curvature at a object side surface and a biconvex lens element $L_{33}$ having a strong curvature at a object side surface. The fourth lends group $G_4$ includes a cemented doublet comprising a biconvex lens element $L_{34}$ having a strong curvature at object side surface and a biconcave lens element $L_{35}$ having a strong curvature at an image side surface.

The attachment lens $L_A$-VII according to the seventh embodiment is substantially described in Table VIII.

TABLE VIII

| Element | Radius of Curvature (mm) | Axial Distance Between Surfaces (mm) | N | ν |
|---|---|---|---|---|
| L29 | R53 = 491.656 | 2.00 | 1.88299 | 40.7 |
|  | R54 = 25.878 | 5.50 |  |  |
| L30 | R55 = −40.339 | 2.00 | 1.83400 | 37.1 |
|  | R56 = 63.286 |  |  |  |
| L31 |  | 5.00 | 1.84665 | 23.9 |
|  | R57 = −54.370 | 1.67 |  |  |
| L32 | R58 = 53.378 | 6.00 | 1.61340 | 43.8 |
|  | R59 = −89.146 | 6.22 |  |  |
| L33 | R60 = 42.978 | 6.20 | 1.48749 | 70.2 |
|  | R61 = −72.048 | 0.20 |  |  |
| L34 | R62 = 189.880 | 3.30 | 1.48749 | 70.2 |
|  | R63 = −85.505 |  |  |  |
| L35 |  | 2.00 | 1.80517 | 25.4 |
|  | R64 = 78.310 |  |  |  |

| Parameters | | | | | |
|---|---|---|---|---|---|
| β | [f1/f4] | N1 | N21 | ν22 | ν21 | ν44 |
| 1.256 | 0.352 | 1.88299 | 1.83400 | 37.1 | 23.9 | 25.4 |

As apparent from the Table VI, the attachment lens $L_A$-VII satisfies the conditions (1) through (6) set forth.

FIGS. 17A, 17B, 17C and 17D show respectively spherical aberrations for g- and d-lines, astigmatism on sagittal (S) and tangential (T) planes, distortion and lateral chromatic aberration of the attachment lens $L_A$-VII. As apparent, the attachment lens $L_A$-VII suitably balances the aberrations of the lens system.

FIG. 9 shows an attachment lens $L_A$-VIII according to an eighth embodiment of the invention. The attachment lens $L_A$-VIII includes a negative power first lens group $G_1$, a second lens group $G_2$, a positive power third lens group $G_3$, and a negative power cemented fourth lens group $G_4$, arranged in order from the image end. Specifically, the first lens group $G_1$ comprises a negative power meniscus lens element $L_{29}$ having a concave image side surface. The second lens group $G_2$ includes a cemented doublet comprising a biconcave lens element $L_{30}$ having a strong curvature at a object side surface and a biconvex lens element $L_{31}$ having a strong curvature at an image side surface. The third lens group $G_3$ comprises a biconvex lens element $L_{32}$ having a strong curvature at a object side surface and a biconvex lens clement $L_{33}$ having a strong curvature at a object side surface. The fourth lends group $G_4$ includes a doublet comprising a biconvex lens element $L_{34}$ having a strong curvature at an image side surface and a biconcave lens element $L_{35}$ having a strong curvature at an image side surface.

The attachment lens $L_A$-VIII according to the eighth embodiment is substantially described in Table IX.

TABLE IX

| Element | Radius of Curvature (mm) | Axial Distance Between Surfaces (mm) | N | ν |
|---|---|---|---|---|
| L29 | R53 = 494.940 | 2.00 | 1.88299 | 40.9 |
|  | R54 = 27.470 | 6.00 |  |  |
| L30 | R55 = −42.775 | 2.00 | 1.83400 | 42.7 |
|  | R56 = 48.901 |  |  |  |
| L31 |  | 6.50 | 1.84665 | 23.9 |
|  | R57 = −53.846 | 2.81 |  |  |
| L32 | R58 = 52.085 | 6.30 | 1.48749 | 70.4 |
|  | R59 = −75.254 | 0.80 |  |  |
| L33 | R60 = 37.752 | 6.30 | 1.56907 | 71.3 |
|  | R61 = −124.370 | 0.20 |  |  |
| L34 | R62 = 217.905 | 3.70 | 1.48749 | 70.4 |
|  | R63 = −104.284 |  |  |  |
| L35 |  | 2.00 | 1.80517 | 25.4 |
|  | R64 = 57.695 |  |  |  |

| Parameters | | | | | |
|---|---|---|---|---|---|
| β | [f1/f4] | N1 | N21 | ν22 | ν21 | ν44 |
| 1.238 | 0.485 | 1.88299 | 1.83400 | 42.7 | 23.9 | 25.4 |

As apparent from the Table IX, the attachment lens $L_A$-VIII satisfies the conditions (1) through (6) set forth.

FIGS. 18A, 18B, 18C and 18D show respectively spherical aberrations for g- and d-lines, astigmatism on sagittal (S) and tangential (T) planes, distortion and lateral chromatic aberration of the attachment lens $L_A$-VIII. As apparent, the attachment lens $L_A$-VIII suitably balances the aberrations of the lens system.

Table X shows the axial distances $D_{AX1}$ and $D_{AX1}$ of the respective attachment lenses according to the first to eighth embodiments.

TABLE X

|  | LA-I | LA-II | LA-III | LA-IV | LA-V | LA-VI | LA-VII | LA-VIII |
|---|---|---|---|---|---|---|---|---|
| DAX1 | 4.04 | 5.04 | 4.04 | 4.04 | 3.54 | 3.54 | 4.04 | 4.04 |
| DAX2 | 10.00 | 10.00 | 10.00 | 10.00 | 10.00 | 10.00 | 10.00 | 10.00 |

Other parameters of the main lens $L_M$ and the attachment lens $L_A$ such as the overall focal length f, the back-focus length Bf, the axial position of exit pupil Dexp, F-number $F_{NO}$ and the Petzval sum Psum are shown in Table XI.

TABLE XI

|  | f' | Bf' | Dexp | FNO | Psum |
|---|---|---|---|---|---|
| LM | 8.47 | 46.04 | 192 |  |  |
| LA-I | 10.72 | 45.89 | 187 | 2.08 | 0.00112 |
| LA-II | 10.01 | 45.94 | 111 | 1.95 | 0.00061 |
| LA-III | 10.61 | 45.90 | 174 | 2.06 | 0.00123 |
| LA-IV | 10.41 | 45.95 | 164 | 2.02 | 0.00139 |
| LA-V | 10.62 | 45.96 | 146 | 2.06 | 0.00283 |
| LA-VI | 10.61 | 45.96 | 148 | 2.08 | 0.00165 |

TABLE XI-continued

|  | f' | Bf' | Dexp | FNO | Psum |
|---|---|---|---|---|---|
| LA-VII | 10.63 | 45.98 | 154 | 2.07 | 0.00258 |
| LA-VIII | 10.48 | 45.95 | 154 | 2.03 | 0.00196 |

The attachment lens of the invention comprising four lens groups provides a sufficiently long back-focal distance and a sufficiently long distance to the exit pupil. In consequence, it is possible to arrange an optical system such as a color separation prism assembly and filters of a TV camera and a video camera with which the attachment lens is used together with a high degree of freedom.

Further, the attachment lens having a conversion ratio of approximately 1 (one) of the invention prevents an occurrence of color shading and converts the balance of axial chromatic aberrations according to main lenses to which the attachment lens is used together, which provides make it possible to use a specific main lens together with a wide variety of TV cameras without modifying dimensions of the TV cameras.

What is claimed is:

1. An attachment lens optical system disposed between a camera lens and an image forming device for extending an overall focal length of the camera lens, said attachment lens optical system comprising, in order from the object side:
   a first lens group consisting of a single lens element selected from a group of a biconcave lens element and a negative power meniscus lens element having a convex object side surface,
   a second lens group including a cemented doublet comprising a biconcave lens element and a biconvex lens element,
   a positive power third lens group including at least a biconvex lens element, and
   a fourth lens group including at least a biconcave lens element, wherein said fourth lens group comprises a cemented lens, and wherein said fourth lens group has a negative power.

2. The attachment lens optical system as defined in claim 1, wherein said attachment lens optical system satisfies the following condition:

$$1.1 \leq \beta < 1.3$$

where $\beta$ is the magnification of the attachment lens optical system.

3. The attachment lens optical system as defined in claim 1, wherein said attachment lens optical system satisfies the following condition:

$$0.1 \leq |f_1/f_4| \leq 0.7$$

where $f_1$ and $f_4$ are the overall focal lengths of the first and fourth lens groups, respectively.

4. The attachment lens optical system as defined in claim 1, wherein said attachment lens optical system satisfies the following conditions:

$$1.8 < N_1$$

$$1.8 < N_{21}$$

$$\nu_{22} < \nu_{21}$$

$$\nu_{44} < 30$$

where $N_1$ and $N_{21}$ are the indices of refraction of the first lens group and the biconcave lens element of the second lens group, respectively, and $\nu_{21}$, $\nu_{22}$ and $\nu_{44}$ are the Abbe numbers of the biconcave lens element of the second lens group, the biconvex lens element of the second lens group and the biconcave lens element of the fourth lens group, respectively.

5. An attachment lens optical system disposed between a camera lens and an imaging device for extending an overall focal length of the camera lens, said attachment lens optical system comprising, in order from the object side:
   a first lens group comprising a first lens which is one of a biconcave lens element and a negative power meniscus lens element having a convex object side surface;
   a second lens group including a cemented doublet comprising a biconcave lens element and a biconvex lens element;
   a positive power third lens group including at least a biconvex lens element; and
   a fourth lens group including at least a biconcave lens element;
   wherein said attachment lens optical system satisfies the following conditions:

$$1.8 < N_1$$

$$1.8 < N_{21}$$

$$\nu_{22} < \nu_{21}$$

$$\nu_{44} < 30$$

where $N_1$ and $N_{21}$ are the indices of refraction of the first lens and the biconcave lens element of the second lens group, respectively, and $\nu_{21}$, $\nu_{22}$ and $\nu_{44}$ are the Abbe numbers of the biconcave lens element of the second lens group, the biconvex lens element of the second lens group and the biconcave lens element of the fourth lens group, respectively.

6. An attachment lens optical system disposed between a camera lens and an imaging device for extending an overall focal length of the camera lens, said attachment lens optical system comprising, in order from the object side:
   a first lens group comprising a first lens which is one of a biconcave lens element and a negative power meniscus lens element having a convex object side surface;
   a second lens group including a cemented doublet comprising a biconcave lens element and a biconvex lens element;
   a positive power third lens group including at least a biconvex lens element; and
   a fourth lens group including at least a biconcave lens element;
   wherein said attachment lens optical system satisfies the following condition:

$$\nu_{44} < 30$$

where $\nu_{44}$ is the Abbe number of the biconcave lens element of the fourth lens group.

7. An attachment lens optical system disposed between a camera lens and an imaging device for extending an overall focal length of the camera lens, said attachment lens optical system comprising, in order from the object side:
   a first lens group comprising a negative power meniscus first lens element having a convex object side surface;
   a second lens group including a cemented doublet comprising a biconcave lens element and a biconvex lens element;

a positive power third lens group including at least a biconvex lens element; and a fourth lens group including at least a biconcave lens element, wherein said attachment lens optical system satisfies the following condition:

$$1.1 \leq \beta < 1.3$$

where $\beta$ is the magnification of the attachment lens optical system.

8. The attachment lens optical system as defined in claim 7, wherein said fourth lens group has a negative power.

9. The attachment lens optical system as defined in claim 7, wherein said attachment lens optical system satisfies the following condition:

$$0.1 \leq |f_1/f_4| \leq 0.7$$

where $f_1$ and $f_4$ are the overall focal lengths of the first and fourth lens groups, respectively.

10. The attachment lens optical system as defined in claim 7, wherein said attachment lens optical system satisfies the following conditions:

$$1.8 < N_1$$

$$1.8 < N_{21}$$

$$\nu_{22} < \nu_{21}$$

$$\nu_{44} < 30$$

where $N_1$ and $N_{21}$ are the indices of refraction of the first lens element and the biconcave lens element of the second lens group, respectively, and $\nu_{21}$, $\nu_{22}$ and $\nu_{44}$ are the Abbe numbers of the biconcave lens element of the second lens group, the biconvex lens element of the second lens group and the biconcave lens element of the fourth lens group, respectively.

* * * * *